US010389509B2

(12) United States Patent
Stirling-Gallacher et al.

(10) Patent No.: US 10,389,509 B2
(45) Date of Patent: Aug. 20, 2019

(54) MULTI-USER, FULL DUPLEX IN-BAND COMMUNICATION IN WIRELESS NETWORKS

(71) Applicant: Futurewei Technologies, Inc., Plano, TX (US)

(72) Inventors: Richard Stirling-Gallacher, San Diego, CA (US); Bin Liu, San Diego, CA (US); Lili Zhang, Beijing (CN); Jian Wang, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 146 days.

(21) Appl. No.: 14/813,736

(22) Filed: Jul. 30, 2015

(65) Prior Publication Data

US 2017/0033916 A1   Feb. 2, 2017

(51) Int. Cl.
*H04L 5/14* (2006.01)
*H04W 72/04* (2009.01)
(Continued)

(52) U.S. Cl.
CPC .............. *H04L 5/1438* (2013.01); *H04L 5/14* (2013.01); *H04W 72/0406* (2013.01);
(Continued)

(58) Field of Classification Search
CPC .................................................... H04L 5/1438
See application file for complete search history.

(56) References Cited

U.S. PATENT DOCUMENTS

2011/0081865 A1* 4/2011 Xiao ................... H04W 52/243
                                                       455/63.1
2011/0280205 A1* 11/2011 Qin ..................... H04W 72/082
                                                       370/329

(Continued)

FOREIGN PATENT DOCUMENTS

CN        104023382        9/2014
EP        2372940 A1       10/2011
(Continued)

OTHER PUBLICATIONS

"Technical Specification: LTE; Evolved Universal Terrestrial Radio Access (E-UTRA); Multiplexing and channel coding", ETSI TS 136 212 V11.5.0 (Jul. 2014) (3GPP TS 36.212 version 11.5.0 Release 11); Copyright 2014 European Telecommunications Standards Institute, (Jul. 2014), 86 pgs.

(Continued)

*Primary Examiner* — Ricky Q Ngo
*Assistant Examiner* — Stephen N Steiner
(74) *Attorney, Agent, or Firm* — Schwegman Lundberg & Wioessner, P.A.

(57) ABSTRACT

A method for scheduling multiple users for multi-user full duplex communications in a wireless network over a wireless channel. The scheduling may be based on base station beam indices, base station channel measurements, received UE capabilities, received UE measured channel conditions and/or received UE positional information. In another embodiment, the scheduling of the UE full duplex time slots may be updated based on base station channel interference measurements, received UE measured channel interference, the received UE measured channel conditions, and/or received UE positional information updates.

31 Claims, 19 Drawing Sheets

(51) Int. Cl.
*H04W 72/12* (2009.01)
*H04L 5/00* (2006.01)

(52) U.S. Cl.
CPC ... *H04W 72/0446* (2013.01); *H04W 72/1231* (2013.01); *H04L 5/0037* (2013.01); *H04L 5/0062* (2013.01); *H04L 5/0069* (2013.01)

(56) References Cited

U.S. PATENT DOCUMENTS

| | | | |
|---|---|---|---|
| 2013/0279457 A1* | 10/2013 | Takano | H04B 7/0452 370/329 |
| 2014/0146765 A1 | 5/2014 | Ji et al. | |
| 2014/0153499 A1* | 6/2014 | Wang | H04W 24/02 370/329 |
| 2014/0169234 A1 | 6/2014 | Zhu et al. | |
| 2014/0226538 A1 | 8/2014 | Wang et al. | |
| 2014/0348040 A1 | 11/2014 | Hong et al. | |
| 2015/0078177 A1 | 3/2015 | Buckley et al. | |
| 2016/0028519 A1* | 1/2016 | Wei | H04B 7/0456 375/267 |
| 2016/0198486 A1* | 7/2016 | Moshavi | H04W 72/12 455/450 |

FOREIGN PATENT DOCUMENTS

| | | | |
|---|---|---|---|
| WO | WO-2014/036025 | 3/2014 | |
| WO | WO-2014/046761 | 3/2014 | |
| WO | WO 2014036025 A1 * | 3/2014 | ............... H04L 5/14 |
| WO | WO-2014/090199 | 6/2014 | |
| WO | WO-2015061233 | 4/2015 | |

OTHER PUBLICATIONS

"Technical Specification: LTE; Evolved Universal Terrestrial Radio Access (E-UTRA); Physical channels and modulation", ETSI TS 136 211 V11.0.0 (Oct. 2012) (3GPP TS 36.211 version 11.0.0 Release 11); Copyright 2012European Telecommunications Standards Institute, (Oct. 2012), 108 pgs.

"International Application No. PCT/CN2016/092377, International Search Report dated Oct. 28, 2016", (dated Oct. 28, 2016), 4 pgs.

"European Application Serial No. 16829889.1, Supplementary European Search Report dated Jun. 1, 2018", 9 pgs.

* cited by examiner

MULTI-USER, FULL DUPLEX IN-BAND COMMUNICATION IN WIRELESS NETWORKS

BACKGROUND

Growing use of wireless systems for both data and voice communications has created a need for additional wireless bandwidth. This may be achieved through many ways including additional bandwidth or improved spectral efficiency in currently used frequency bands.

Higher frequency bands are being used to add additional capacity in wireless communication systems. For example, millimeter wave (mmWave) wireless communications may provide relatively high data rates (e.g., gigabits per second) in microcells and picocells. The highly directional characteristic of mmWave communication is ideally suited to cellular communications, particularly in crowded urban environments. The mmWave systems use narrow beam antennas that enable an increased density of communication devices without causing interference. Since a greater number of highly directional antennas can be placed in a given area, the net result is greater reuse of the spectrum.

Spectral efficiency may also be improved by using full duplex communications. Full duplex communications enables two or more communication devices to transmit and receive on the same frequency and at the same time.

SUMMARY

A method for interference cancellation in multi-user full duplex communications in a wireless network includes scheduling served user equipment (UE) for full duplex time periods of a communication frame over a wireless channel. The scheduling may be based on base station beam indices, base station channel measurements, received UE capabilities, received UE measured channel conditions and/or received UE positional information. In another embodiment, the scheduling of the UE full duplex time periods may be updated based on base station channel interference measurements, received UE measured channel interference, the received UE measured channel conditions, and/or received UE positional information updates.

BRIEF DESCRIPTION OF THE DRAWINGS

FIGS. 12A-2B are a flowchart illustrating a method for scheduling and serving users for full duplex communications in a wireless network, in accordance with various embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The following description includes an initial discussion of the different interferences caused by full duplex communications, UE-to-UE interference avoidance, and interference cancellation. The various embodiments are then discussed.

Interference Avoidance and Cancellation

Full duplex communications may result in many forms of interference to user-received signals. For example, user-to-user interference may occur when one user is transmitting to a base station (e.g., evolved NodeB (eNB), access point (AP), transmission point) while a neighboring user is receiving from the same base station. Additionally, a user's own communications in the same frequency band may cause interference since the transmission power may be substantially greater than the received power. This may typically be referred to as self-interference. Other interference paths may also be possible.

Various embodiments are described that implement beamforming in at least the base station and schedule user communications at the base station for full duplex time periods (e.g., sub-frames, time slots). The initial decision as to which time periods to use and which users to assign to each time period may be performed based on multiple base station parameters including: the base station's assigned beam index for each user, fed back reference signal received power (RSRP) for each communication device, referred to as user equipment (UE), as an indication of channel conditions, reported UE position or angular UE beam index, base station position, as well as other criteria as described subsequently.

The various embodiments operate in wireless communication systems which have to use beamforming (examples are systems using millimeter wave) WLAN type systems standardized at the Institute of Electrical and Electronics Engineers (IEEE) 802.11 standards-based systems, or future 3$^{rd}$ Generation Partnership Project (3GPP) 5G system based on mmWave as well as other wireless systems. For simplicity, subsequent descriptions refer to full duplex communications at the base station. However, described embodiments may be applied to full duplex communications at the UE as well.

Figure 1:
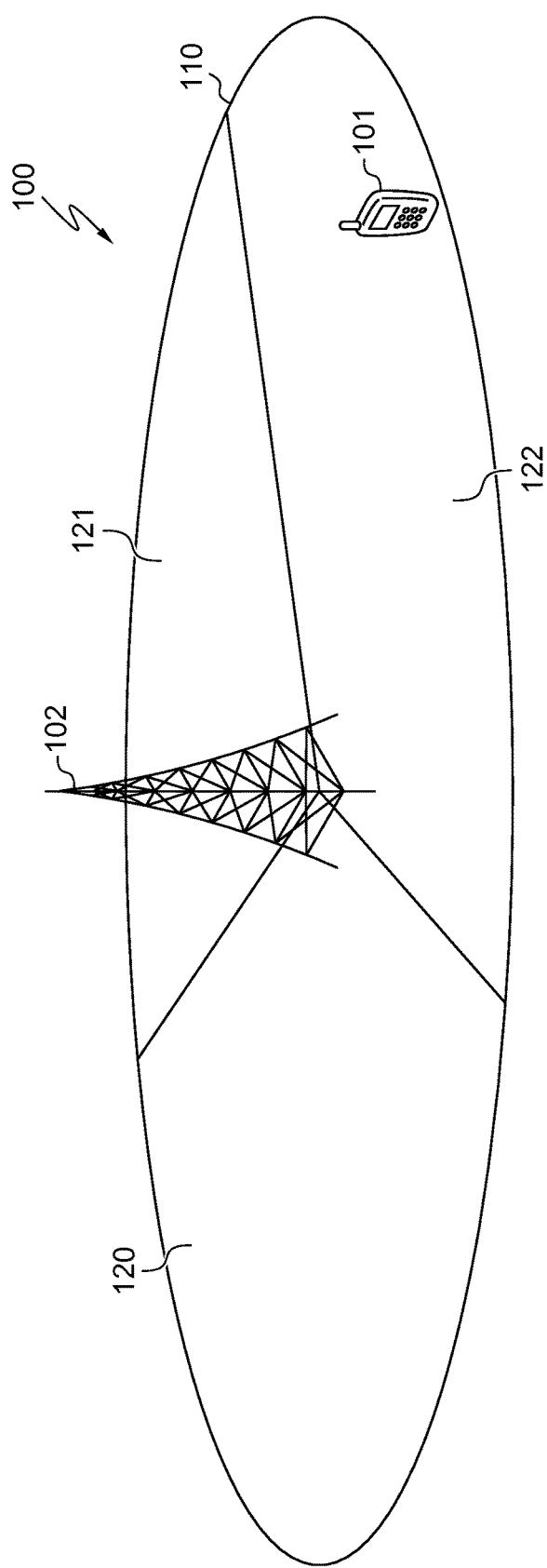
FIG. 1 is a diagram illustrating a wireless communication system, in accordance with various embodiments.

FIG. 1 is a diagram illustrating a wireless communication system, in accordance with various embodiments. For example, the wireless communication system 100 may be a cellular system that enables wireless communication devices 101 to communicate with one or more base stations 102 (e.g., evolved Node B (eNB)) over one or more wireless channels using a wireless communication technique (e.g., mmWave, time division duplex (TDD), frequency division duplex (FDD)).

The wireless communication devices 101 may be non-stationary devices. For example, the wireless communication devices 101 may include mobile radiotelephones, tablet computers, lap top computers, and other devices that may communicate over a wireless channel with the base station 102. For consistency and simplicity, the wireless communication devices 101 are subsequently referred to as user equipment (UE). The UE includes a transceiver and control circuitry coupled to a plurality of antenna elements through which beamforming may be accomplished.

The base station 102 may include a plurality of antennas coupled to a transceiver as well as control circuitry to control the base station operation. FIG. 1 and subsequent figures show only a single antenna for purposes of simplicity and clarity. However, a person of ordinary skill in the art would realize that for beamforming to be accomplished, the base station 102 comprises a plurality of antenna elements.

The base station 102 has a fixed location and may be part of a stationary base station network including other base stations that are coupled to a larger network. For example, the base station 102 may be part of a wired network that is coupled to the Internet. The UE 101 may then access the larger network by communicating over the wireless communication channels with the base station 102.

The base station 102 communicates over an area 110 substantially surrounding the base station antenna. This area 110 is typically referred to as a cell 110 and may comprise one or more sectors 120, 121, 122. While three different sectors 120, 121, 122 are shown making up the cell 110 of FIG. 1, other embodiments may comprise different sector quantities.

While a plurality of UEs 101 may be within the cell 110 generated by the base station 102, not all of the UEs 101 may be in contact with the base station 102. A UE 101 that is registered with the base station or is attempting to register with the base station 102 may be defined as a "served UE". Other UEs may be registered with other, neighboring base stations.

In the following embodiments, the base stations are disclosed as operating in the mmWave band (e.g., 30-300 GHz) or upper regions of the centimeter wave (cmWave) band (i.e. 6 GHz to 30 GHz). However, the present embodiments are not limited to any one frequency or frequency band or any one wireless communication technique (e.g., time division duplex (TDD), frequency division duplex (FDD)).

Some of the characteristics of mmWave (or upper part of the cmWave band) communications include the short wavelength/high frequency, large bandwidth, high interaction with atmospheric constituents, and high attenuation through most solid objects. The high attenuation characteristic may be compensated for by the use of highly directional antennas (e.g., beamforming) in both the UE and the base station.

Beamforming in a mmWave system uses the multiple antenna elements of both the UE and the base station to communicate. The beam formed at the base station could be a "narrow beam" (i.e., 8° half power beam width (HPBW)). The beam formed at the UE may be much wider. For example, the UE may use several antenna elements, on a radio chip, to perform beam-forming, whereas the base station may use many more antenna elements.

The base station 102 transmits a plurality of beamformed reference signals into the cell 110. Each reference signal comprises a unique base station beam index (or beam pointing direction) that identifies that particular beam and its transmission direction to both the UE and the base station. The beam index is used subsequently in various embodiments of a method for determining which users to schedule and serve for full duplex communications.

Figure 2:
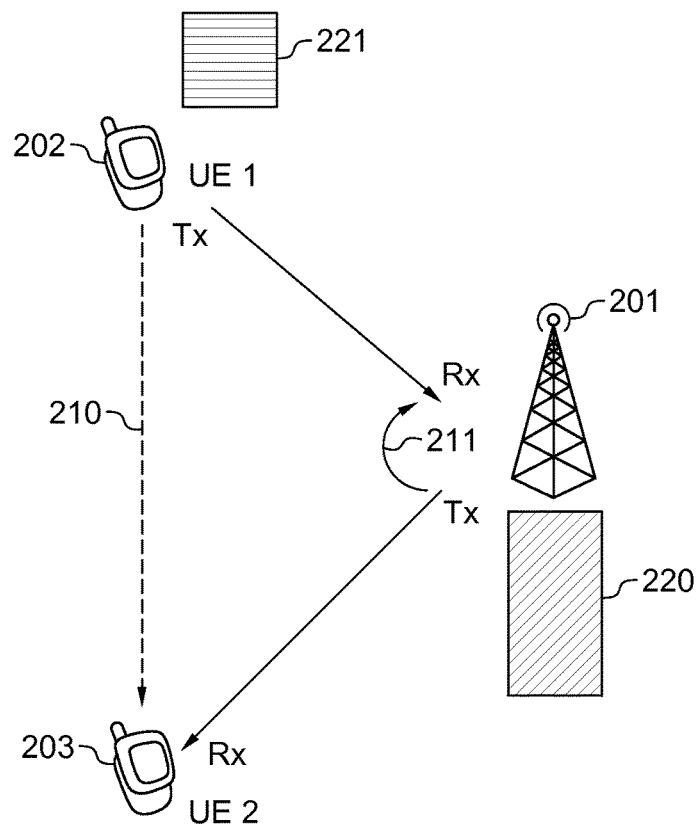
FIG. 2 is a diagram illustrating multi-user full duplex interference, in accordance with various embodiments.

FIG. 2 is a diagram illustrating multi-user full duplex interference, in accordance with various embodiments. This diagram shows a base station 201 (e.g., eNB, access point) that may serve UEs in its cell coverage area. Two UEs 202, 203 are located within the cell area of the base station 201. These UEs 202, 203 are subsequently referred to as UE1 202 and UE2 203. For purposes of this example, UE1 202 is assumed to be transmitting signals to the base station 201 and UE2 203 is assumed to be receiving signals from the base station 201.

This figure shows the possible UE-to-UE interference 210 that may occur between UE1 202 and UE2 203 as a result of the transmissions from UE1 202. There may also be self-interference 211 as a result of the base station transmitting to UE2 203 while substantially simultaneously receiving from UE1 202. The figure shows example time/frequency resources i 220, 221 needed for BS-to-UE2 and for the UE1-to-BS link. The two time/frequency resources s 220, 221 show that the time and/or frequency resources for the two links may not be the same and in this example the resources needed for the UE1-to-BS link are substantially less than the resources needed for the BS-to-UE2 link.

Figure 3:
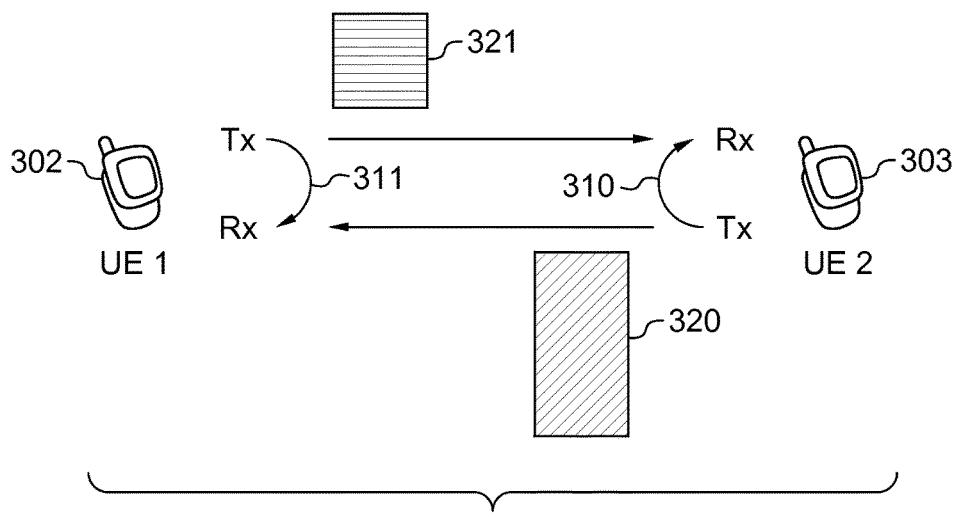
FIG. 3 is a diagram illustrating self-interference in a peer-to-peer, in-band full duplex link, in accordance with various embodiments.

FIG. 3 is a diagram illustrating self-interference in a peer-to-peer, in-band full duplex link, in accordance with various embodiments. For such a peer-to-peer link, there is no UE to UE interference and the only interference is the self-interference.

For example, FIG. 3 shows two UEs 302, 303 communicating directly with each other. Each transmission may be received by the transmitting UE and, thus, cause the self-interference. For example, UE1 302 transmitting to UE2 303 may cause self-interference 811 while UE2 303 transmitting to UE1 may cause self-interference 310. The time and/or frequency resources 320 used by one UE (e.g., UE2 303) may be substantially different than the time and/or frequency resources 321 used by the other UE (e.g., UE1 302).

Figure 4:
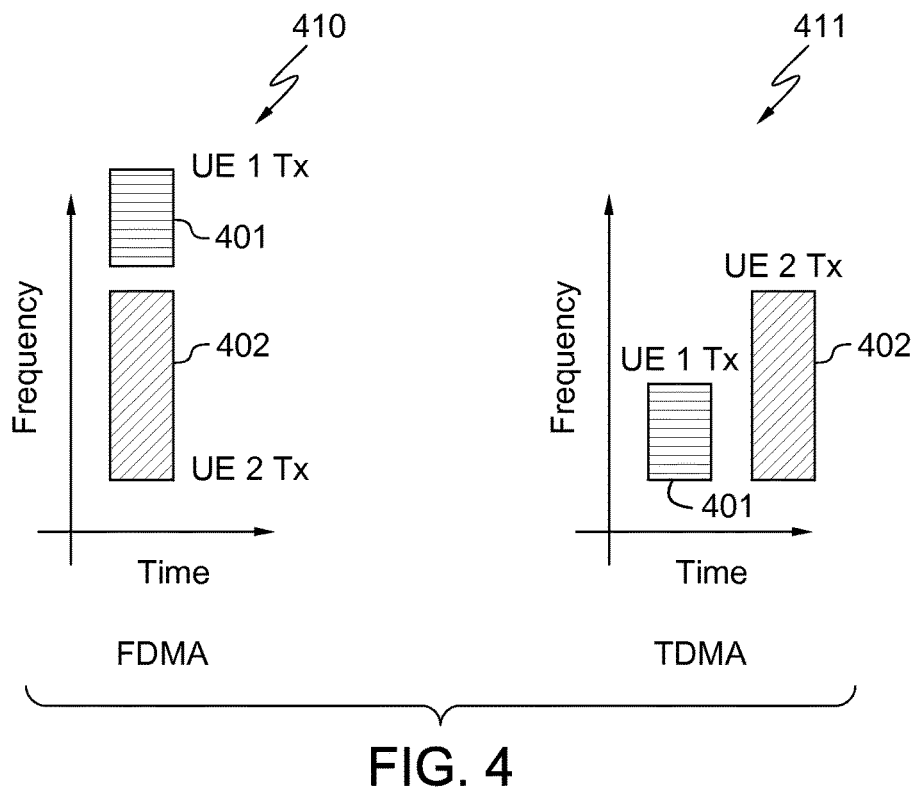
FIG. 4 shows resources in time and frequency for conventional duplexing schemes, in accordance with various embodiments.

FIG. 4 shows time-frequency resources for conventional multiplexing schemes (frequency division multiple access (FDMA) and time division multiple access (TDMA), in accordance with various embodiments. The time-frequency resources 410, 411 in this figure illustrate the time and/or frequency resources 401, 402 used in conventional duplexing schemes for two transmitting UEs (i.e., UE1, UE2).

The left plot 410 shows a FDMA scheme while the right plot 411 shows a TDMA scheme. Each block 401, 402 is indicative of the time and/or frequency resources used for that particular UE (e.g., UE1, UE2).

The FDMA plot 410 shows that the UE1 transmit time and/or resources block 401 is transmitted at substantially the same time but at a different frequency than the UE2 transmit time and/or resources block 402. The TDD plot 411 shows that the UE1 transmit time and/or resources block 401 and the UE2 transmit time and/or resources block 402 are transmitted at different times but at the same frequency.

Figure 5:
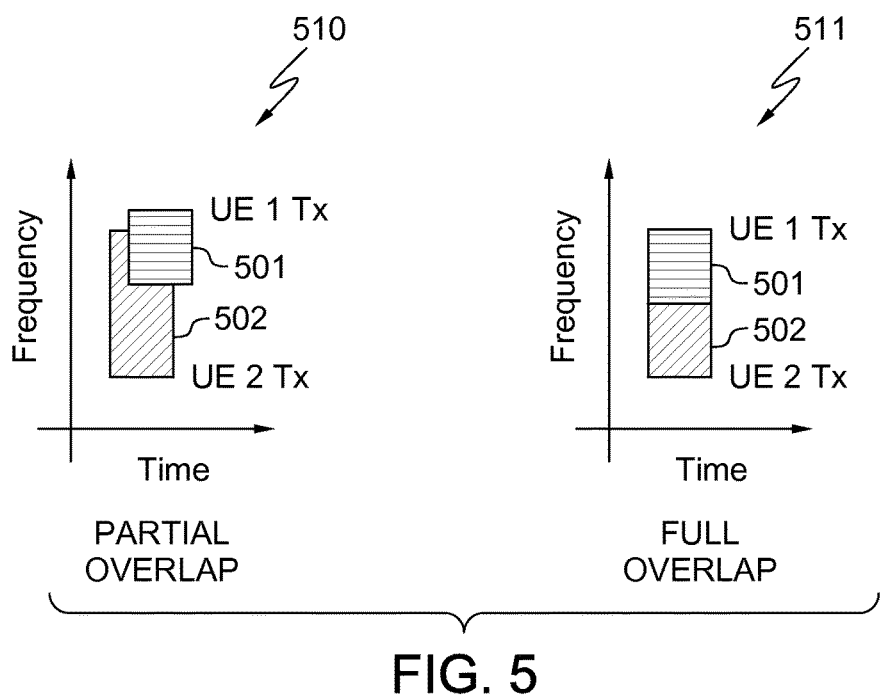
FIG. 5 shows resources in time and frequency for in-band full duplex schemes, in accordance with various embodiments.

FIG. 5 shows time frequency resources for in-band full duplex schemes, in accordance with various embodiments. The resources 510, 511 in this figure illustrate the time and/or frequency resources 1001 for the UE1 to UE2 link and the time and/or frequency resource 502 for the UE2 to UE1 link. These resources 510, 511 are used for in-band full duplexing schemes for two transmitting UEs (i.e., UE1, UE2).

The left plot 510 shows a partial overlap of resources 501, 502 in which the resource blocks 501, 502 are offset from each other by frequency and/or time. The right plot 511 shows a full overlap of resources 501, 502 in which frequency and time are the same. Each block 501, 502 is indicative of the time and/or frequency resources used for that particular UE (e.g., UE1, UE2). Both UEs typically perform self-interference cancellation for the overlapped regions in order for reliable communication to occur.

Figure 6:
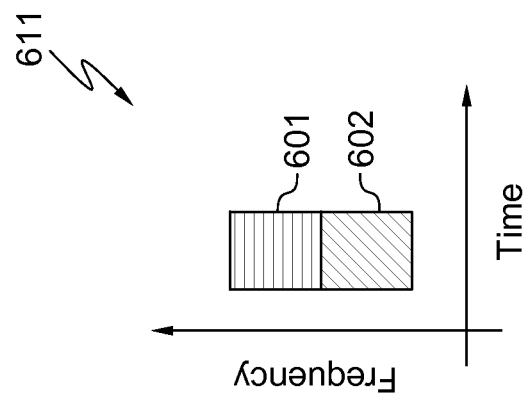
FIG. 6 shows resources in time and frequency for multi-user full duplex at the base station, in accordance with the embodiment of FIG. 2.
Figure 6:
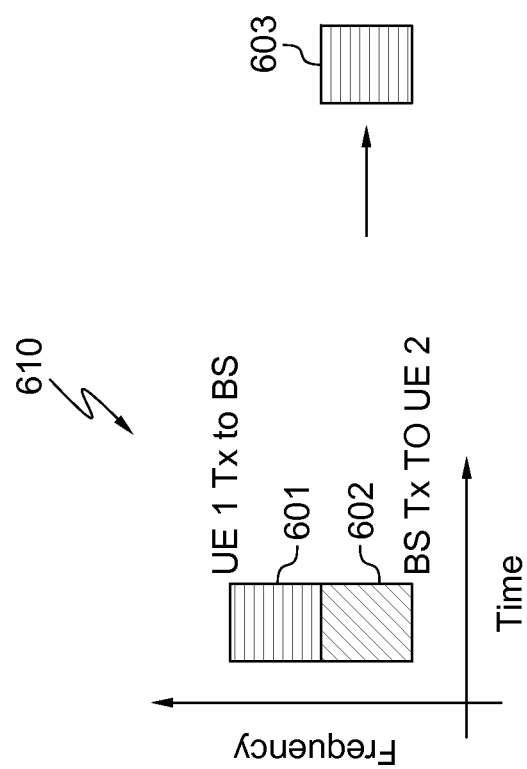

FIG. 6 shows time frequency resources for multi-user full duplex at the base station, in accordance with the embodiment of FIG. 2. Time is shown along the x-axis of the plots 610, 611 and frequency is shown along the y-axis of the plots 610, 611. The resources 601 for the UE1 to base station link are shown overlapped with the resources 602 for the base station to UE2 link.

For simplicity and clarity, the present disclosure focuses on full duplex at the base station. However, the UEs may also support in-band full duplex. Thus, the embodiments disclosed herein may be applied to full duplex at the UEs as well.

When the UEs support in-band full duplex operations, there may be additional possible interference paths from one UE to another UE. The left plot 610 shows full overlapped resource blocks 601, 602. The resource blocks 601, 602 are shown overlapped indicating that UE1 is transmitting to the base station at substantially the same time as the base station is transmitting to UE2 with overlapping frequency bands. The base station may then perform self-interference cancellation to extract the desired signal 603.

The right plot 611 shows the same overlapping resource blocks 601, 602 as received at UE2. Here the level of the UE1 to UE2 received interference power depends on the UE-to-UE path loss, UE1 transmit power, and Tx(UE1)/Rx (UE2) antenna gains in a given direction.

To manage UE-to-UE interference issues in full duplex systems, the solutions may be categorized into two groups: 1) UE-to-UE interference avoidance and 2) interference cancellation/suppression. The UE-to-UE interference avoidance may avoid schedule of neighboring UEs when the positions of the UEs are known. The UEs may be scheduled in separate groups in one cell or based on path loss estimates and estimates of UE-to-UE interference. The interference cancellation/suppression may perform interference cancellation with advanced receiving UEs via an interference cancellation receiver, receiver null beamforming, or power control.

Interference avoidance for full duplex communication, as disclosed herein, may use the assigned base station beam indexes with received signal reference power (RSRP) information. If different UEs are served by different beams at the base station and the RSRP is low, it is assumed that the UEs are not directly next to each other. This information may be supplemented with other information in order to obtain an improved estimate or the UE's position and the probable UE's beam pointing direction(s) and possible interference to other UEs. The UE's capabilities (e.g., whether it can perform beamforming, number of antenna elements, advanced position capabilities) should also be determined in order to estimate interference rejection capability (e.g., front-to-back rejection ratio). The RSRP with beamforming may also be used to assess if a given base station to UE link can be supported for full duplex communications by the base station (the base station may compare this to full duplex coupling loss for that beam-combination).

Figure 7A:
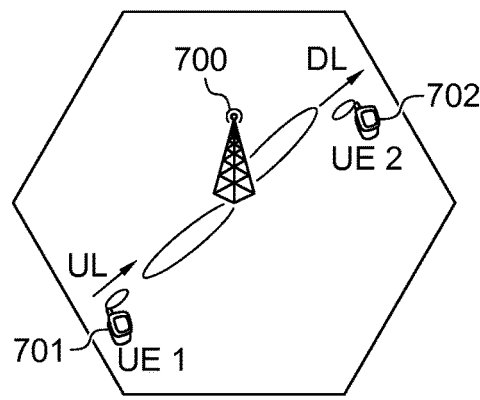
FIGS. 7A-C are diagrams illustrating diagonal UE locations, non-diagonal UE locations, and locations of UEs which are allocated the same beam from the base station (or eNB), respectively, in accordance with various embodiments.
Figure 7B:
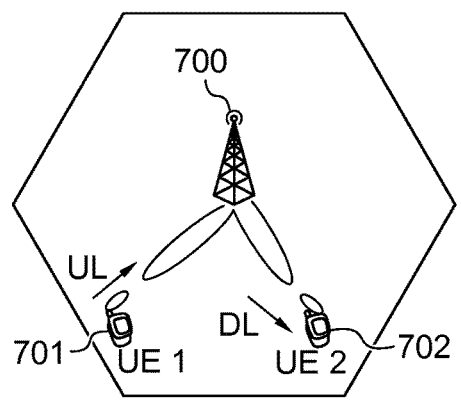
Figure 7C:
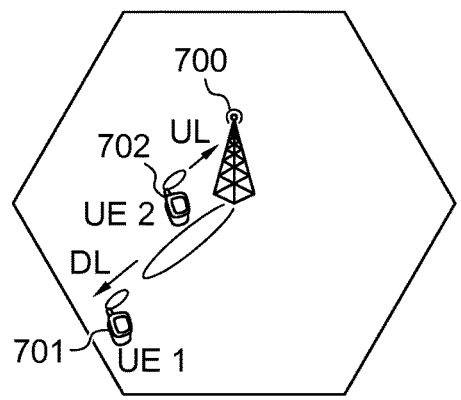

FIGS. 7A-C are diagrams illustrating diagonal UE locations, non-diagonal UE locations, and same beam UE locations, respectively, for the case that the UEs are performing beam-forming and in accordance with various embodiments. Interference avoidance with UEs 701, 702 having beamforming capability should not be typically uplink (UL)/downlink (DL) co-scheduled when that are served by diagonally opposite beams at the base station 700, as illustrated in FIG. 7A. This may result in an undesirable interference scenario. However, such a scenario may be allowable if UE1 701 uplink power control is not applied and UE1 RSRP (when UE 1 is transmitting, the RSRP is measured at the base station)+UE2 RSRP (when UE 2 is receiving, the RSRP is measured at the UE's 2 receiver) is less than some predetermined threshold T1, where the threshold T1 has been previously determined to result in reliable full duplex communications when the UEs are uplink (UL)/downlink (DL) co-scheduled. Another scenario that may be allowable for diagonally opposite beams at the base station for co-scheduled UL/DL communications is when the receiving UE (UE2 in this example) has an RSRP value which is lower than a predetermined threshold T2, whereby the threshold T2 has been determined to result in reliable full duplex communications, when UE UL power control is on and the UEs are uplink (UL)/downlink (DL) co-scheduled.

FIG. 7B illustrates UE1 701 and UE2 702 that are served by different, angled beams at the base station. Such a scenario may be very favorable to be selected to co-schedule UE 1 for uplink and UE 2 for downlink, since the UEs beams are also likely to be pointing inwards towards the base station (as illustrated in FIG. 7B) and any possible UE to UE interference would most likely be low. Even in a non-line of sight (NLOS) scenario, when the UE beams are not pointing inwards towards the base station, any UE-to-UE interference is likely to be blocked by objects that are providing the respective reflected signal path. The base station may be able to identify NLOS links by a sudden drop in RSRP with an associated base station beam index change. The base station may then apply extra criteria for such NLOS links. However, there may NLOS links that have an RSRP that is too low to support full duplex communications.

FIG. 7C illustrates a scenario in which the UEs 701, 702 are both served by the same beam at the base station. Such a scenario may include: 1) UE2 702 (which is transmitting) is closer to the base station (with a higher RSRP measured at the base station) than UE1 701 (which is receiving); 2)

UE2 702 (which is transmitting) is further away from the base station (with lower RSRP) than UE1 701 (which is receiving); or 3) both UEs 701, 702 have substantially similar distances to the base station with substantially similar RSRPs and either UE 701, 702 is transmitting or receiving.

In order to determine which of the scenarios of FIG. 7C produce reliable full duplex communications, the base station may use the following information: RSRP of the different UEs 701, 702; the back-to-front rejection ratio of the UE antenna array (related to the number of UE antenna elements); and the side-to-front rejection ratio of the UE antenna array (related to the number of UE antenna elements). However if the RSRP of a given link is too low for reliable communications, full duplex operations may not be scheduled for that particular link.

Successful interference avoidance for full duplex operations with UEs having no beamforming capability may rely on the estimated distance between the UEs. An estimate of the distance between UEs may be accomplished with UE positional information (e.g., GPS) or without UE positional information (e.g., no GPS).

Figure 10A:
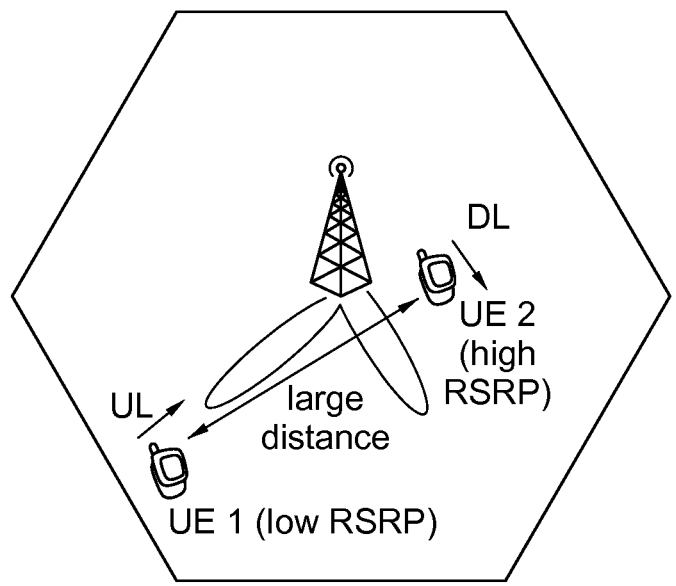
FIGS. 10A-C are diagrams showing UE locations having varying UE-to-UE distances, according to various embodiments.
Figure 10B:
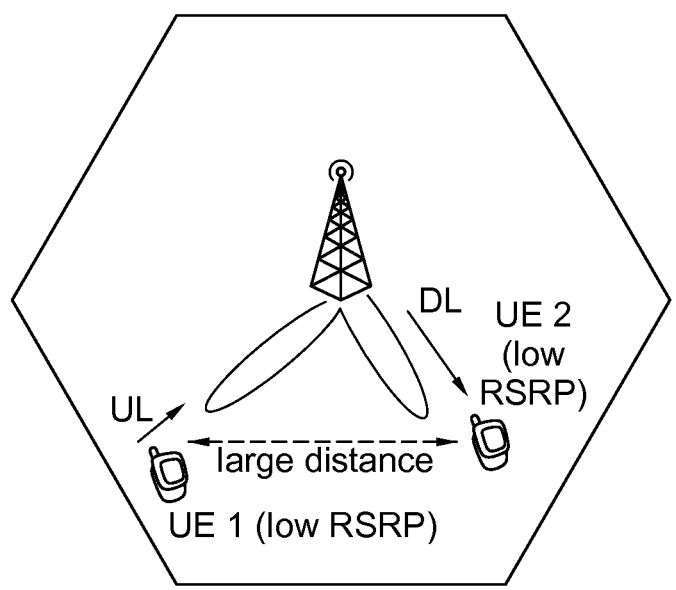
Figure 10C:
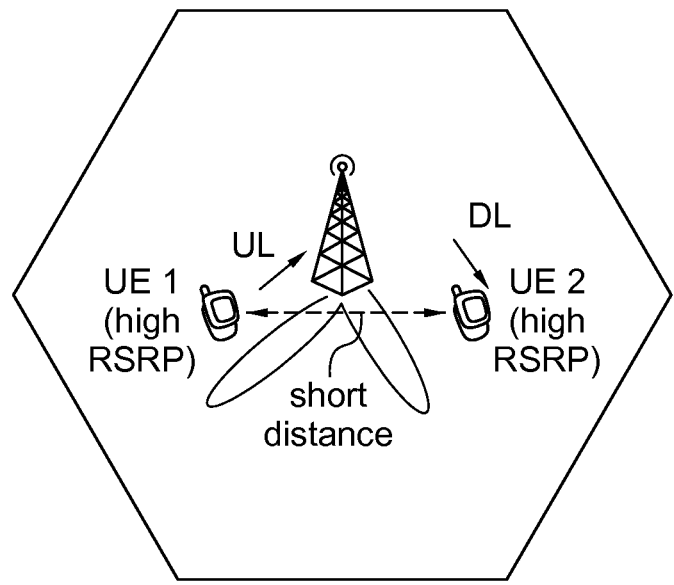

FIGS. 10A-C are diagrams showing UEs without beamforming capability and having varying UE-to-UE distances, according to various embodiments. FIG. 10A shows non-beamforming UE1 and UE2 with a relatively large UE-to-UE distance. UE1 is experiencing a relatively low RSRP while UE2 is experiencing a relatively high RSRP. FIG. 10B shows non-beamforming UE1 and UE2 with a relatively large UE-to-UE distance. UE1 and UE2 are both experiencing a relatively low RSRP. FIG. 10C shows non-beamforming UE1 and UE2 with a relatively short UE-to-UE distance. UE1 and UE2 both are experiencing a relatively high RSRP.

It can be seen from FIGS. 10A-C that the non-beamforming UEs that are served by different base station beams and have either low RSRPs or a large difference between their respective RSRPs may be co-scheduled. This may be represented by |UE1 BS beam index−UE2 BS beam index|>T3 and (|UE1 RSRP−UE2 RSRP|>T4 or (UE1 RSRP+UE2 RSRP)<T5)) where T3, T4, and T5 are predetermined thresholds that may provide reliable full duplex communications. T3 may be fixed or dynamically set based on the sum of the UE's RSRPs.

Figure 11:
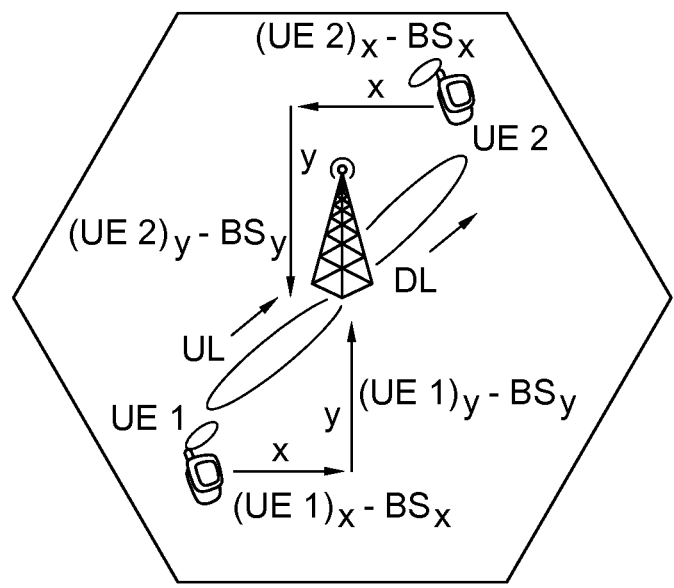
FIG. 11 is a diagram showing UEs having no beamforming capability that take into account UE relative distance to the base station, according to various embodiments.

FIG. 11 is a diagram showing UEs having beamforming capability that take into account UE relative distance to the base station, according to various embodiments. Interference avoidance for full duplex operations may be accomplished using multi-dimensional position information. If the UEs do not have beamforming capability, the simpler approach may be used by using GPS or if GPS is not available by using the BS beam index and RSRP information as discussed above. However, if the UEs have beamforming capability and multi-dimensional position information, the UE's relative distance to the base station can be taken into account during scheduling users to avoid interference. This may avoid scheduling the UEs together with diagonally aligned UE beams (see FIG. 7A). If possible, it may be desirable to avoid co-scheduling UE1 and UE2 when $(UE2)_i - BS_i = -((UE1)_i - BS_i)$ for all orthogonal dimensions i, where i represents the x, y or z coordinates of the UEs and the BS with respect to a known reference point.

Figure 8:
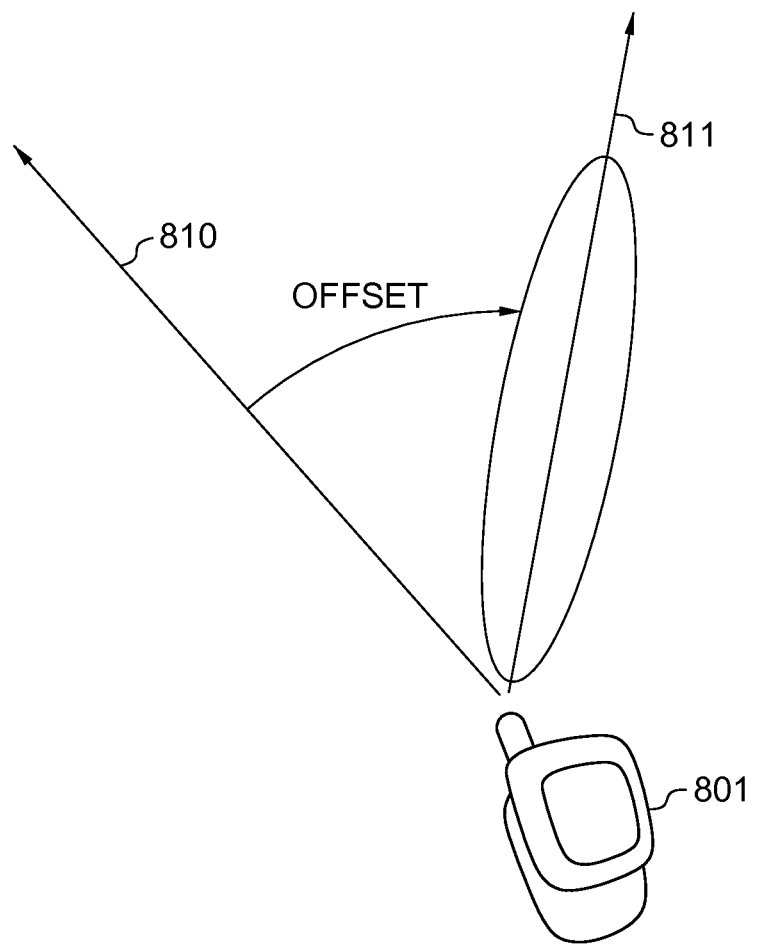
FIG. 8 is a diagram showing a UE beam offset, in accordance with various embodiments.

FIG. 8 is a diagram showing a beam offset, in accordance with various embodiments. In determining a UE beam offset, the UE 801 comprises some form of advanced positional information (e.g., gyroscope, compass, accelerometers). If the UE 801 has this advanced positional capability and the capability is activated, the UE may report, to the base station, the difference in angle (i.e., degrees, radians) between the selected UE beam 811 and a fixed reference line 810 (e.g., magnetic north). In another embodiment, the UE 801 may report the elevation (i.e., tilt of the UE) to the base station. The base station may then use this information from different UEs to improve its estimate of the UE-to-UE interference for different UE combinations, as discussed previously. The UE may also report the number of antenna elements to the base station.

To perform UE-to-UE interference suppression/cancellation for full duplex, the "victim" UE (UE subjected to interference) must estimate the channel between the "aggressor" UE (UE causing interference) and itself. The estimated channel may be referred to as the interference channel. In order to facilitate this estimation, the base station transmits information about the "aggressor" UE to the "victim" UE.

The base station transmitted information may include: the time and frequency location and possible spreading/scrambling sequence of the aggressor UE pilot signals; any power offsets between the aggressor UE pilot signals and the aggressor UE data signals; the number of layers of the aggressor UE data; and the frame format of the aggressor UE data. For example, in a mmWave system using an LTE-type uplink, the base station may signal to the victim UE the following parameters of the aggressor UE: the root Zadoff-Chu sequence for the demodulation reference signal (DMRS) pilots; a 3-bit signaling indicating the cyclic shift and orthogonal cover code; the number of layers of the data; and the chosen cyclic prefix length. This is for a LTE-type uplink for any other system the exact details of which signals need to be signaled from the base station to the victim UE to enable interference channel estimation may depend on the uplink pilot signal format for the system and the uplink frame format.

In order to provide the interference channel estimation information to the UEs that have interference cancellation capabilities, the signaling may be accomplished using a dedicated physical control channel (DPCCH). Presently in LTE, a number of different data control indicator (DCI) formats are transmitted using the DPCCH. These formats may include: a) DCI format 0 used for uplink grant and resource allocation for UL data; b) DCI formats 1, 1A, 1B, 1C used for different modes of one physical downlink shared channel (PDSCH) code word scheduling; c) DCI formats 1D, 2, 2A, 2B, 2C, 2D used for different modes of spatial multiplexing; d) DCI formats 3, 3A used for different modes of physical uplink control channel (PUCCH) and power control signaling of PUCCH; e) DCI format 4 used for UL assignment for UL multiple input multiple output (including uplink DMRS cyclic shift and OCC).

For mmWave transmissions, DMRS downlink-based transmission may be used since beamforming is also used for channel state information-reference signal (CSI-RS) based transmissions. If the receiving "victim" UE has highly advanced interference cancellation (IC) capabilities and can utilize knowledge of the modulation and coding (MCS) level for the transport block (5-bits) of the co-scheduled uplink ("aggressor") UEs the following bit fields may be defined and consequently signaled to the "victim" UE: MCS_field_TB (5 bits or 0 bits)—0 bits is for interference cancellation (IC) receivers without this capability. If the receiving "victim" UE has advanced interference cancellation capabilities (as opposed to "highly advanced") and can utilize knowledge of the modulation level for each transport block (2 bits) (QPSK, 16 QAM, 64 QAM) of the co-scheduled uplink ("aggressor") UE, the following bit fields may be defined: MOD_field_TB (2 bits or 0 bits)—0 bits is for IC receivers without this capability.

To provide the "victim" UEs with knowledge of the uplink UEs DMRS to estimate the channel, three bits may be used to signal the orthogonal cover code and the cyclic shift of the root Zadoff-Chu sequence. A further two bits may be used to indicate the number of uplink layers (up to four). These fields may be defined as OCC_OC_field (3 bits) and Uplink_layer_field (2 bits). For the root sequence for the DMRS pilots $r_{uv}(k)$, where ($0 \leq k < L_{RS}-1$) where $L_{RS}$ is the length of the sequence (=12× number of uplink resource blocks used), there may be 30 groups of sequences (u=0, 1, . . . , 29) and two possible sequences for each length (v=0, 1). Both the sequence (v) and the group (u) may hop in time depending upon the time slot index $n_s$.

In order to simplify signaling, the base station may disable sequence and group hopping for the interfering uplink UEs. By selecting "Disable-sequence-group-hopping", both the sequence (v) and the group (u) hopping are disabled for each time slot. The sequence group (u=0, 1, . . . , 29) is then defined by $u=(f_{ss})$ mod 30. Thus, the following extra bit fields are signaled for the root Zadoff-Chu sequence to the receiving "victim" UE: Sequence_group_field(u) (5 bits); Sequence_field(v) (1 bit); Sequence_length_field_in_RBs ($L_{RS}$) (7 bits) for a maximum of 128 resource blocks (RBs).

In order that the receiver "victim" UE may synchronize and eventually decode the DMRS of the uplink UE, it also uses the chosen cyclic prefix of the uplink UE. Two choices are provided in LTE, standard cyclic prefix and extended cyclic prefix. Thus, the following bit field is defined: cyclic_prefix_length_field (1 bit).

Figure 9:
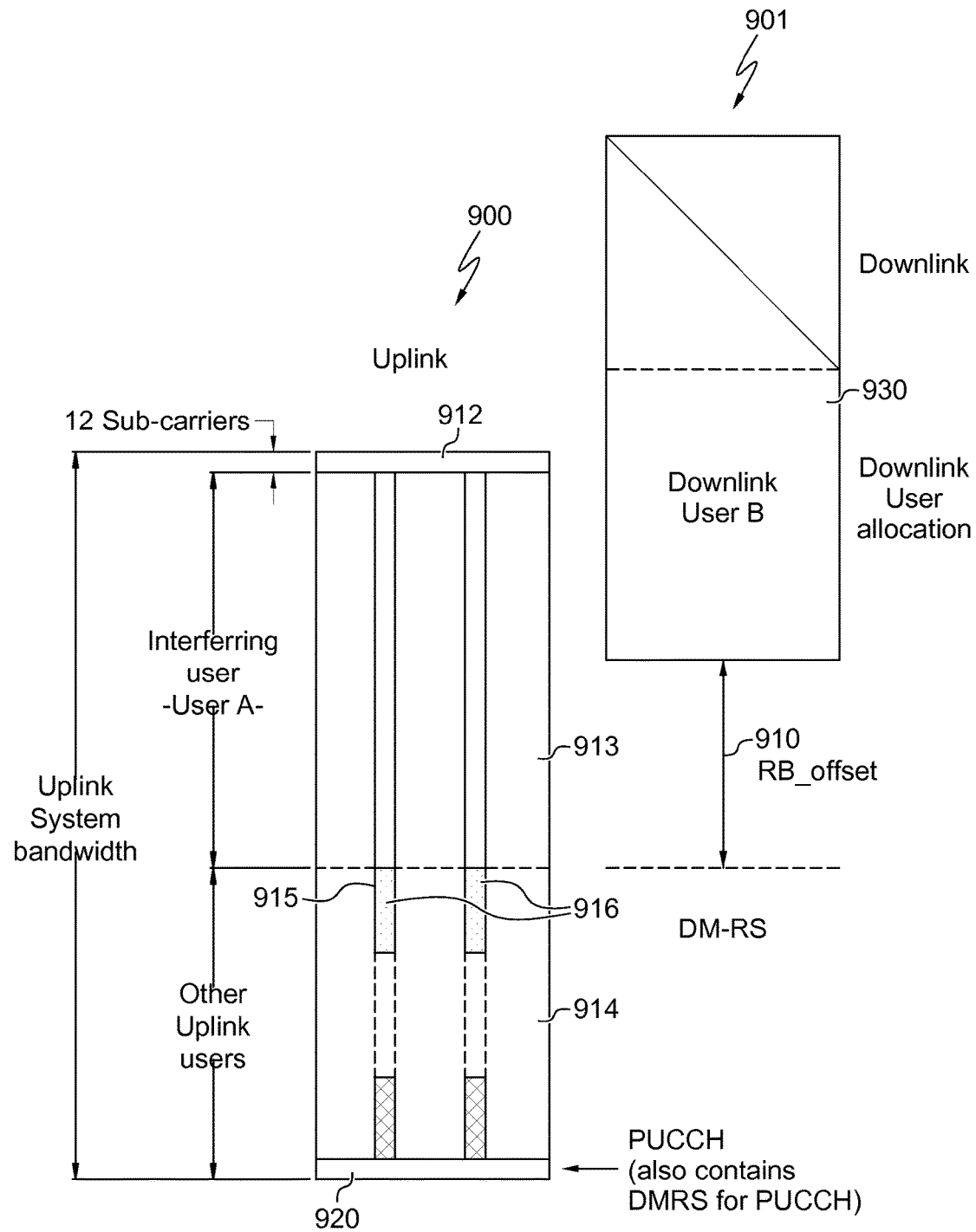
FIG. 9 is a diagram of an uplink and downlink LTE-A resources, according to various embodiments.

FIG. 9 is a diagram of overlapped time-frequency resources of uplink 900 and downlink 901 UEs which could be scheduled for full duplex, according to various embodiments and in accordance with LTE. The uplink 900 may include the subcarriers for, the interfering user (e.g., User A) 913, subcarriers for other uplink users 914, the physical uplink control channel (PUCCH) 920 and 912. The DMRS 915 and 916 for the uplink users may also be included. The downlink time-frequency resources 901 may include the downlink time frequency resources of User B 930. The offset in frequency between the lowest frequency of the downlink User B 930 (the "victim" UE) and the lowest frequency of the interfering uplink users 913 may be referred to as the RB_offset 910.

Since the interfering uplink RBs may be offset in frequency (by a certain number of RBs) to the receiving UE RBs, this offset is signaled to the receiving UE so that the receiving UE can correctly offset the Zadoff-Chu sequence. The field RB_offset (5 bits) for a maximum of 64 RB offset may be used.

VARIOUS EMBODIMENTS

Figure 12A:
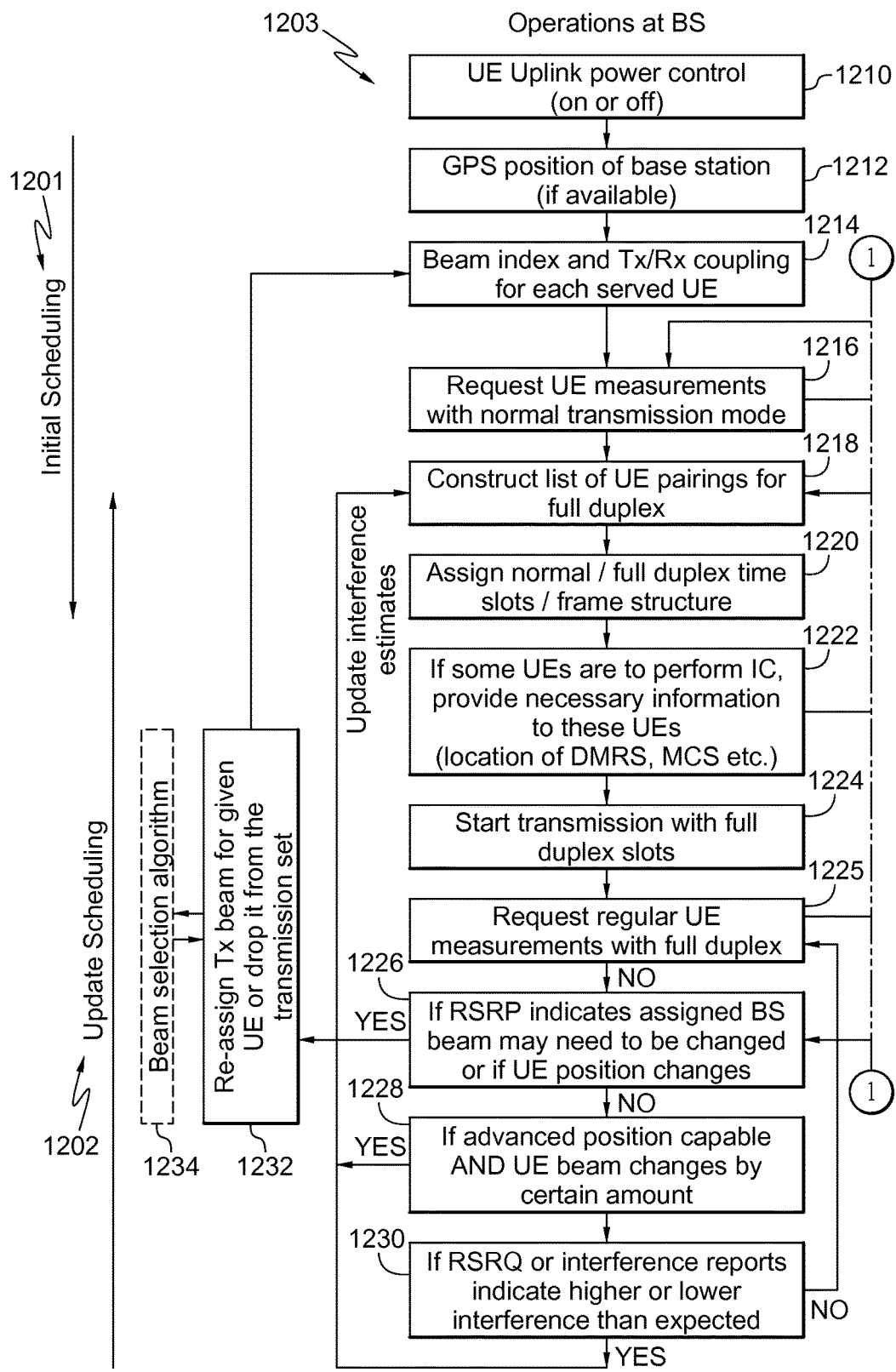
Figure 12B:
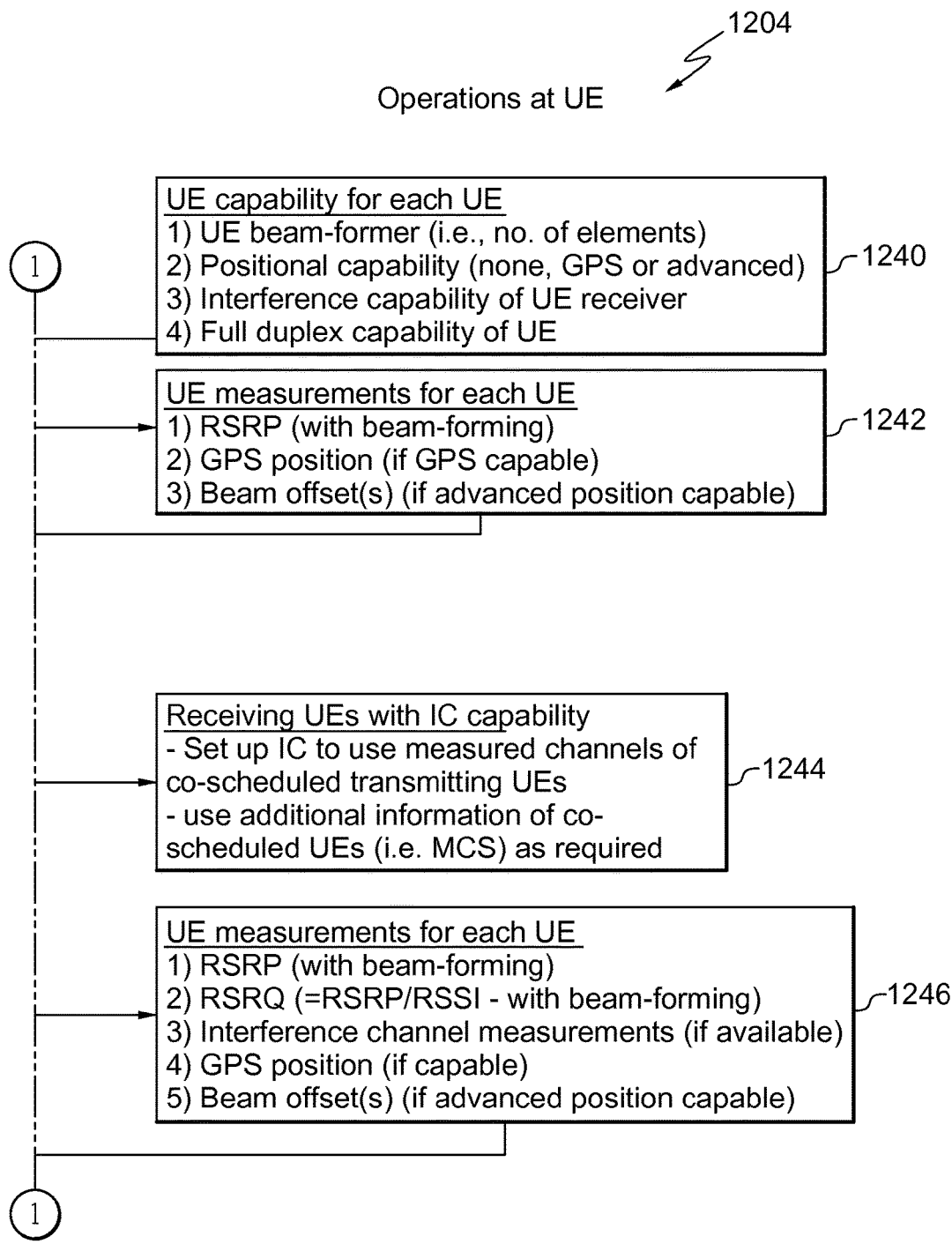

FIGS. 12A-12B are a flowchart illustrating a method for scheduling of users for full duplex communications in a wireless network, in accordance with various embodiments. The method of FIGS. 12A and 12B take into account estimates of UE-to-UE interference within one cell coverage area or sector coverage area when deciding which users to schedule.

Subsequent use of a time period may refer to one or more time slots or one or more sub-frames. Examples of each are illustrated subsequently in FIG. 15. Also, a full duplex frame may be defined as a frame that comprises full duplex sub-frames.

The flowchart begins with an "initial scheduling" 1201 of full duplex time periods that may then be updated by "update scheduling" 1202 as shown. The flowchart further illustrates operations performed at the base station 1203 and operations performed at the UE 1204.

As part of the initial scheduling 1201 of served UEs for full duplex time periods, the method of FIGS. 12A-12B generally assigns time periods based on each UE's capability 1240 (as described subsequently), the base station beam index (or beam pointing direction for non-code book based transmissions) for each served UE and respective full duplex coupling (isolation between Tx and Rx signals), and UE measurements for normal transmission mode (i.e., non-full duplex). As part of the update scheduling 1202 of served UEs for full duplex time periods, the method of FIGS. 12A and 12B updates a particular UE's assigned time period based on actual measurements of channel interference. If a new base station beam is allocated to the served UE, the initial scheduling begins again.

In block 1210, the base station determines a status of the served UE's uplink power control (e.g., on or off). The UE's uplink power control may have two components: open loop and closed loop. The open loop power control component initially sets the UE transmit power using measurements obtained from signals sent by the base station with no feedback from the base station regarding the power to be used for transmission. The closed loop power control component uses base station feedback to the UE regarding the power level of received signals at the base station. The UE may then adjust its transmit power based on that feedback.

Whether UE uplink power control is on or off is used by the base station in determining the possible interference that one transmitting UE may have over another co-scheduled receiving UE. If the uplink power control is off, the transmitting UE will have different level of interferences to receiving UEs than if the power control was turned on.

In block 1212, the position of the base station is determined (e.g., GPS). The position of the base station may be used to determine the relative position of each served UE with respect to the base station. When the served UEs have beam-forming capability, the relative distance of the UE to the base station may be taken into account in order to avoid scheduling uplink and downlink UEs together with aligned UE beams.

In block 1214, the base station determines the beam index and transmit and receive (TX/RX) coupling loss for each served UE. As previously discussed, the beam index identifies a particular beam and, thus, the particular antenna elements used to form that beam, to the base station. The TX/RX coupling loss for each served UE provides information on the amount of coupling loss, at the base station, between the transmitted signal and the received signal due to the transmitted signal when the base station performs full duplex. The TX/RX coupling loss may be approximately in a range of between −80 dB and −120 dB. The TX/RX coupling loss may be different for different UEs since the base station performs beamforming to transmit and receive with UEs at different angular locations and the beamforming affects the final result.

Each served UE provides its capability to the base station in block 1240. These capabilities may include whether the UE is capable of performing beamforming. This information may include the number of antenna elements in the UE. The base station uses the beamforming capabilities of the UE as an indication as to how well a UE can suppress UE-to-UE interference.

Also in block 1240, the UE also provides the base station with information regarding whether the UE includes positional capability (e.g., GPS receiver, advanced positional capability) that is referred to herein as received UE positional information. In an embodiment, a UE with advanced position determination capability may be defined as a UE having additional sensors (e.g., gyroscopes, accelerometers, compass) that not only enable the UE to determine its location but also determine its orientation (e.g., direction of beam pointing with respect to magnetic north, tilt at that position). Such an advanced position determination capable UE may be able to determine a beam offset (i.e., a difference in angle (i.e., radians, degrees) between a selected UE beam and a fixed reference point (e.g., magnetic north)) and, optionally, determine its elevation or tilt with respect to the base station (so the beam offsets can reported in both azimuth and elevation). Such a UE may be able to transmit this capability to be received by the base station so that the base station may use this information, possibly with other UE capability reports, such as number of antenna elements, to improve its estimate of UE-to-UE interference for different UE combinations.

While the beam index at the UE may provide an indication of UE pointing direction referenced to its housing, the UE beam offset provides an indication of the actual beam pointing direction taking into account the orientation (e.g., in x, y, and z directions) of the UE. Thus, when a UE rotates in a set location, the beam index may stay the same but the beam offset may change.

Also in block 1240, the UE's capabilities may further indicate if the UE can perform interference cancellation. Whether the UE can perform full duplex communication may also be considered a UE capability as reported in block 1240. Even if the UE is not able to operate in a full duplex mode, the UE may still be co-scheduled in the downlink or uplink slots with another UE operating in an opposite direction from the non-full duplex UE when the base station is operating in the full duplex mode.

The UE capability is provided to the base station prior to the base station requesting the UE to perform measurements or schedule the UE for transmission or reception of data. The UE typically reports its capability to the base station as soon as it is in a connected state with the base station. Thus, the location of block 1240 feeding the capability into block 1216 is only one such embodiment.

In block 1216, the base station requests each served UE's channel measurements resulting from a normal, non-full duplex transmission mode. Thus, each served UE, in block 1242, performs actual channel measurements, it reports its position (if position determination capable), and/or determines one or more base station beam offsets if the UE is advanced position capable. If the UE reports its position and the base station knows its position (see block 1212), the base station can then calculate the relative position of the UE to the base station.

There are multiple types of UE channel measurements. For example, one type of channel measurement that may be reported by each served UE is a received signal strength indicator (RSSI) that is the wideband received signal (including noise and interference). Another type of channel measurement report is a reference signal received power (RSRP) that is a measurement of the wanted received signal power. Yet another possible reported channel measurement is a reference signal received quality (RSRQ) that is a metric describing the quality of the received signal. In an example, RSRQ=RSRP/RSSI.

Based on the UE measurements, the base station, in block 1218, may then construct a list of served UE pairings for full duplex communication using the UE capability, the channel measurements in normal transmission mode, each served UE's position (if reported) and the resulting beam index serving that particular UE, and the UE's power control status.

The base station, in block 1220, may now assign a transmission time period, within the base station's transmission frame structure, for each served UE on the list of served UE pairings constructed in block 1218. The transmission time period may be in a particular assigned beam for each served UE. The base station may assign both normal, non-full duplex transmission time periods as well as the full duplex time periods.

In block 1222, the base station provides additional information to the served receiving UEs which have the capability to perform interference cancellation. This additional information enables the receiving interference UEs to estimate the interference channel from the co-scheduled uplink UEs and to perform interference cancellation. The additional information provided to the served UEs may include the parameters (and/or time frequency location) of the demodulation reference signal (DMRS) and/or modulation and coding scheme (MCS) level which is allocated to co-scheduled transmitting UEs. Interference cancellation, in an embodiment, may refer to a particular UE canceling the received signal of other UEs that are transmitting while the particular UE is receiving.

In block 1244, the served UEs with interference cancellation capabilities may set up interference cancellation to use measured channels of co-scheduled transmitting UEs. The served UEs may also use additional information (e.g., MCS) regarding co-scheduled uplink UEs. The UE may perform interference cancellation using receiver beamforming or by using advanced receivers that include interference cancellation capabilities, both of which have the UE perform measurements of the channel interference. The UE may also use additional parameters from the interfering signal (e.g., modulation level, coding scheme) for the interference cancellation.

In block 1224, the base station begins to transmit to the served UEs on the list of block 1218 using scheduled full duplex time slots in the transmission frames. In block 1225, the base station requests each served UE to perform full duplex channel measurements in the full duplex mode. These measurements are illustrated in lock 1246.

In block 1246, each served UE measures or otherwise determines the RSRP with beamforming, the RSRQ with beamforming, interference channel measurements (if available), its position (if position capable), and/or the beam offset if the UE is advanced position determination capable. This information is supplied to the base station in block 1226.

Up to this point, each served UE has been receiving a signal from the base station over its respective assigned beam. In block 1226, the base station determines if the RSRP from each served UE (as received from block 1246) indicates that another base station beam should be assigned to each respective UE. Another base station beam may be assigned to a particular UE if that UE has moved to another location served by another beam.

If another base station beam is to be assigned, in block 1232 a transmit beam is re-assigned for the served UE. This is assuming that the UE is still within the original base station's cell coverage area. If the location (or beam indexes) of the served UE indicates that the UE has moved out of the base station's cell coverage area, that UE is dropped from the transmission list. If the transmission beam is to be reassigned or the UE is dropped from the transmission list, the scheduling method begins again at block 1214.

The beam selection algorithm of block 1234 is a beam selection step that may use conventional, existing procedures of the base station to find the best beam direction for each user.

In block 1226, if the RSRP from each served UE indicates that the base station beam does not need to be reassigned, the method moves to block 1228 where it is determined if the UE is advanced position capable and, if so, the value of the reported UE beam offset is tested to see if it has changed by an amount greater than a certain threshold compared to a previous value.

If either one of these conditions is not true (i.e., the UE is not advanced position capable or the UE beam offset has not changed by certain threshold), then block 1230 determines if the present channel interference (e.g., RSRQ or channel interference report) is now higher or lower than expected. If the channel interference has not changed, then the method loops from block 1225 where UE channel measurements are requested by the base station (i.e., UE measurement block 1246). If the channel interference has changed, then the method returns to block 1218 where the UE pairing list is constructed for full duplex operation.

The method of FIG. 12 for scheduling users considers possible UE-to-UE interference within one cell. However, UE-to-UE interference between two cells (i.e., adjacent base stations) or adjacent sectors of one cell may occur for UEs that are on the edge of a cell coverage area or sector coverage area when one UE is transmitting and the other UE is receiving. In order to estimate UE-to-UE interference in either scenario, neighbor base stations may communicate UE channel interference measurements and base station beam indices assigned to each served UE to each other. This information sharing may be performed in each time slot on a frame-by-frame basis and may use an X2 backhaul interface (as defined in 3GPP/Long Term Evolution (LTE) standard) or a dedicated base station-to-base station link (e.g., wireless, wireline). The dedicated link may provide a higher capacity and reduced latency in order to support frame-by-frame communications of scheduling information.

The full duplex communications involving UE-to-UE channel interference between two cell or sector coverage areas may be accomplished in multiple ways depending on the latency or capacity of the base station-to-base station link. The UE-to-UE channel interference may be handled on a frame-by-frame basis between the base stations (see FIG. 13) or on a less frequent than a per frame basis (see FIG. 14).

Figure 13A:
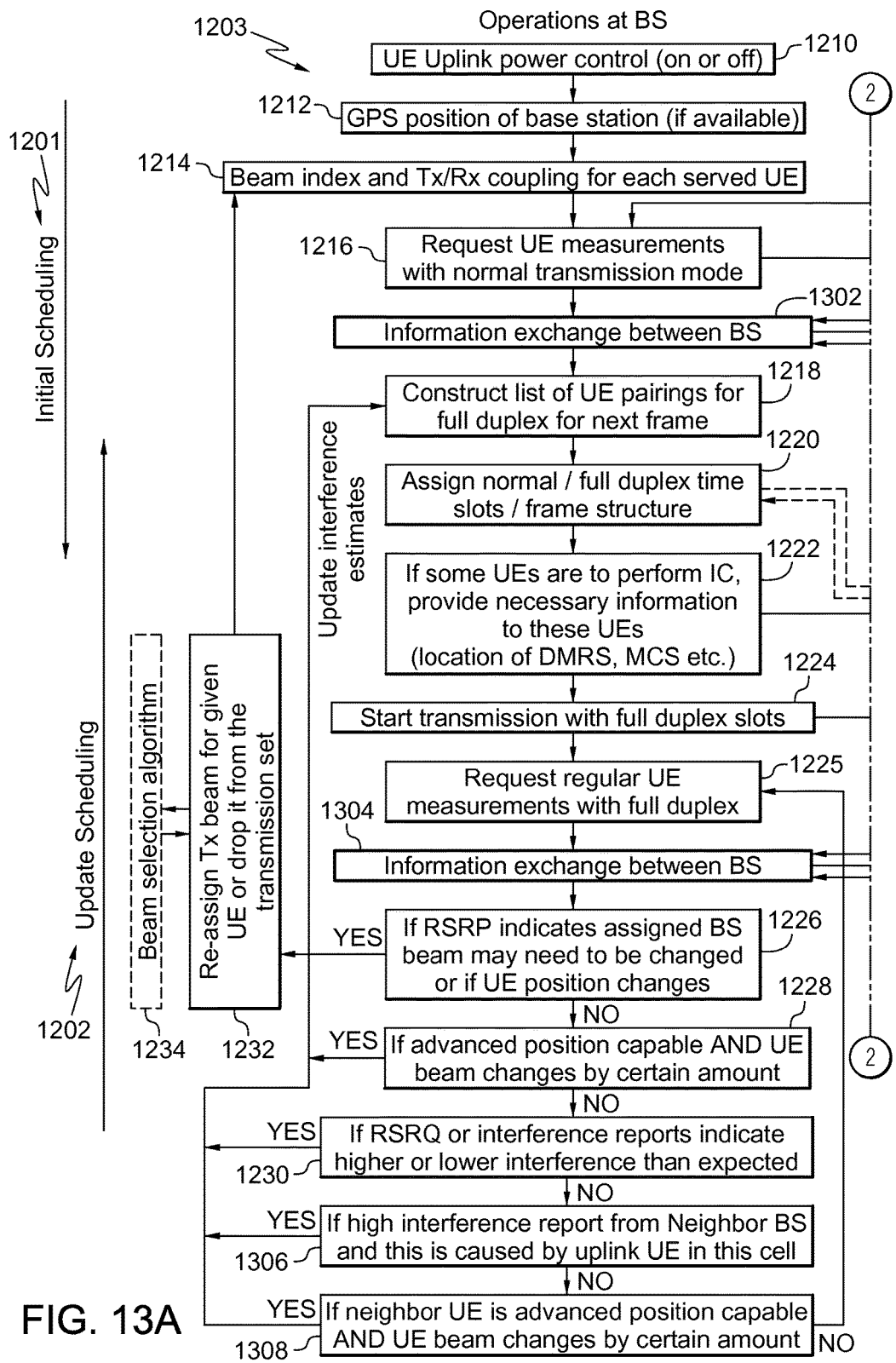
FIGS. 13A-13C are a flowchart illustrating another method for scheduling of users for full duplex operation in a wireless network, in accordance with various embodiments.
Figure 13B:
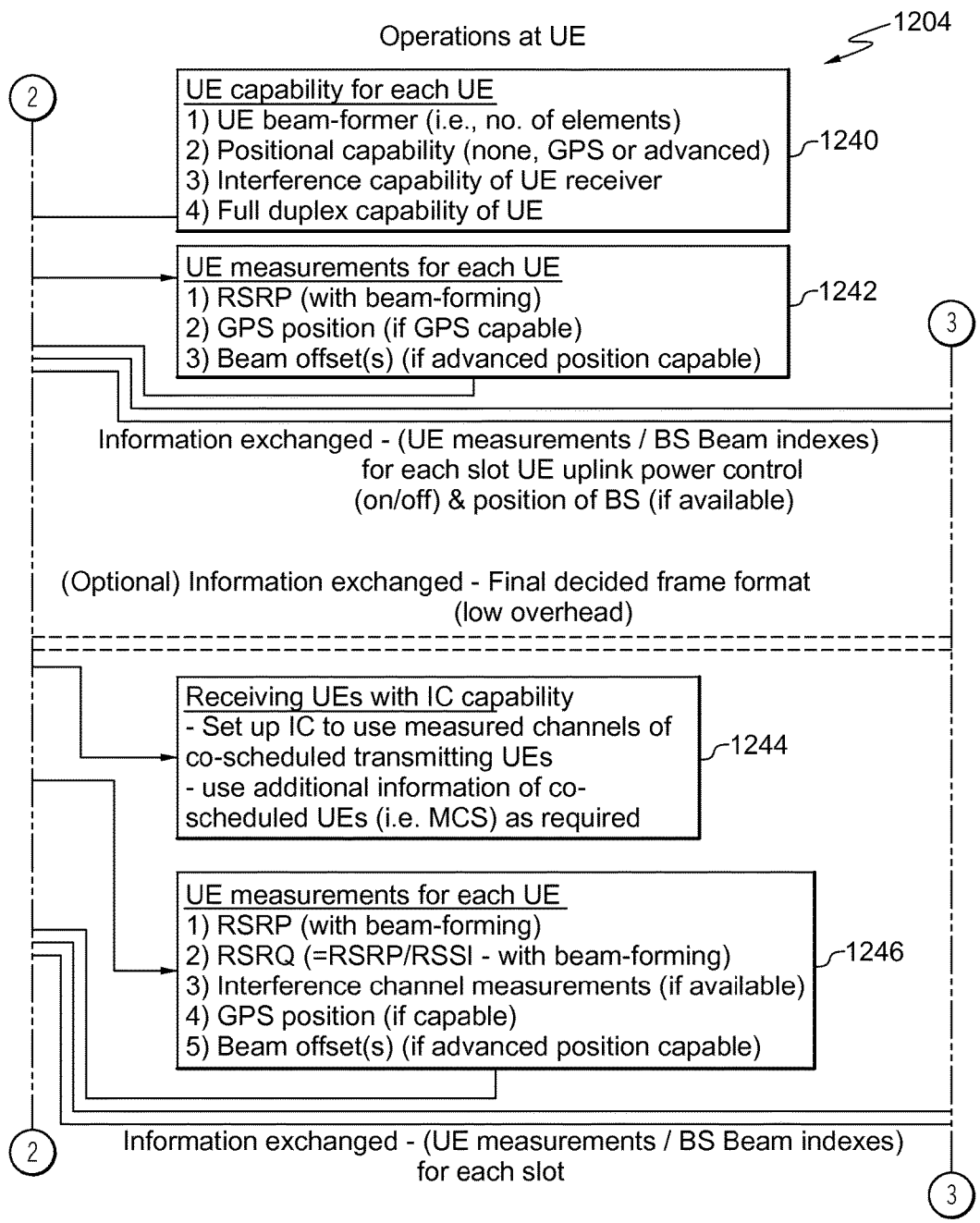
Figure 13C:
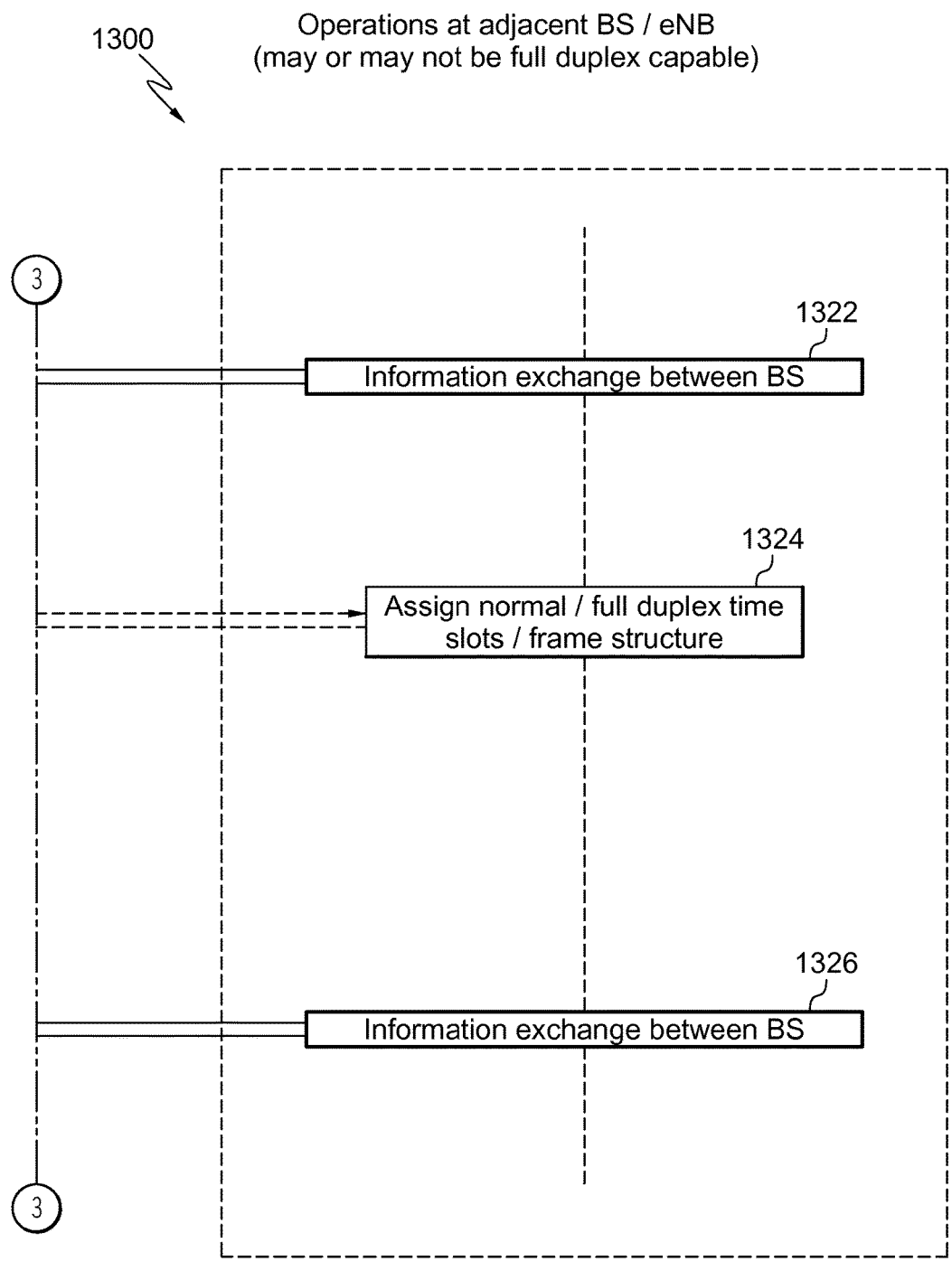

FIGS. 13A-13C are a flowchart illustrating another method for scheduling of user for full duplex operation in a wireless network, in accordance with various embodiments. This first method, using a low latency high bandwidth connection (i.e. using a dedicated mmWave band link) for communication between base stations, provides scheduling of users for full duplex communications on a frame-by-frame basis when the UEs are on the edge of a cell's coverage area or a sector's coverage area.

The embodiment of FIGS. 13A-13C is substantially similar to the embodiment disclosed in FIGS. 12A-12B discussed previously. Only those blocks 1302, 1304, 1306, 1308, 1322, 1324, 1326 that are different are discussed. The other blocks of FIGS. 13A-13C are assumed to have substantially the same function as previously discussed.

In blocks 1302 and 1322, after the serving base station has requested the UE to perform measurements with a normal, non-full duplex transmission (see block 1216), information is exchanged between adjacent base stations 1203, 1300. The exchanged information may include UE channel measurements and/or base station beam indexes for each time period, UE uplink power control status (i.e., on/off), and/or position of the transmitting base station if it is available. In response to the information from the serving base station 1203, the neighboring base station 300 transmits substantially similar information back in block 1322.

In blocks 1304 and 1326, after the base station has requested regular UE measurements with of the full duplex channel, in block 1225, substantially similar information is again exchanged with the neighboring base station 1300. The information from the neighboring base station 1300 is then used in block 1306 where it is determined if the neighboring base station 1300 (i.e., adjacent base station) is reporting a channel interference that is different than estimated and if the interference is caused by an uplink transmission from a UE in the present cell. If this condition is true, the interference estimates are updated and the UE pairing list is reconstructed for full duplex operation of the next frame 1218.

If neither the neighboring base station 1300 is reporting a high level of channel interference nor any interference is caused by the uplink transmission from the UE in the present cell, the method determines if any UEs in the neighboring cell are advanced position capable and if reported beam offset from any UEs have changed by a certain amount. If this is true, the method goes to block 1218 to reconstruct the UE pairings list for full duplex operation for the next frame. If this condition is not true, the base station 1203 returns block 1225 to request a regular UE channel measurement over a full duplex channel.

In another optional step, block 1220 may exchange a frame format information with the neighboring base station 1300. For example, blocks 1220, 1324 may exchange the base station beam allocation per slot (or per sub-frame) for full duplex frames and/or UE measurements per slot (or per sub-frame) for duplex frames as well as other frame format information.

Figure 14A:
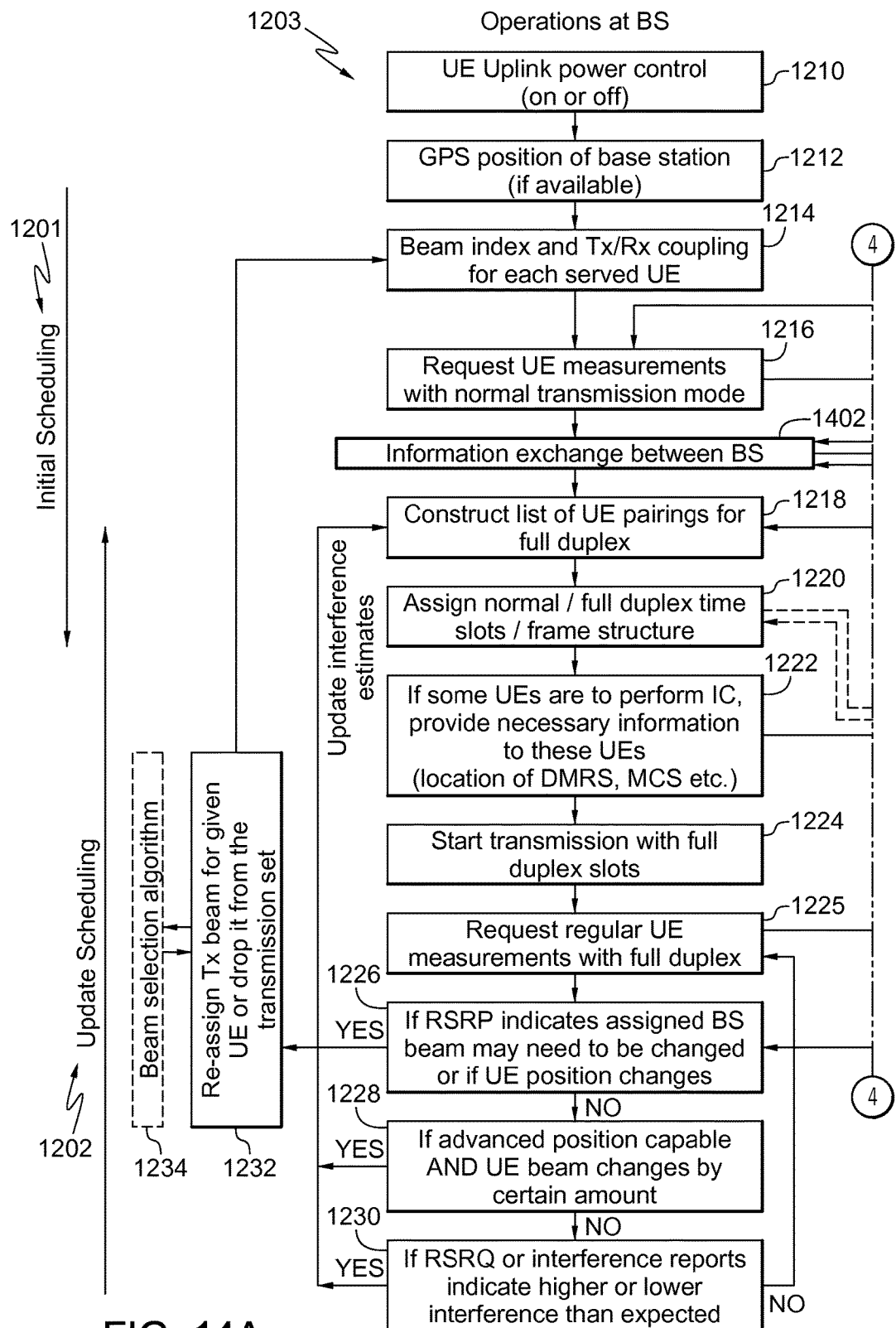
FIGS. 14A-14C are flowcharts illustrating another method for interference cancellation of full duplex communications in a wireless network, in accordance with various embodiments.
Figure 14B:
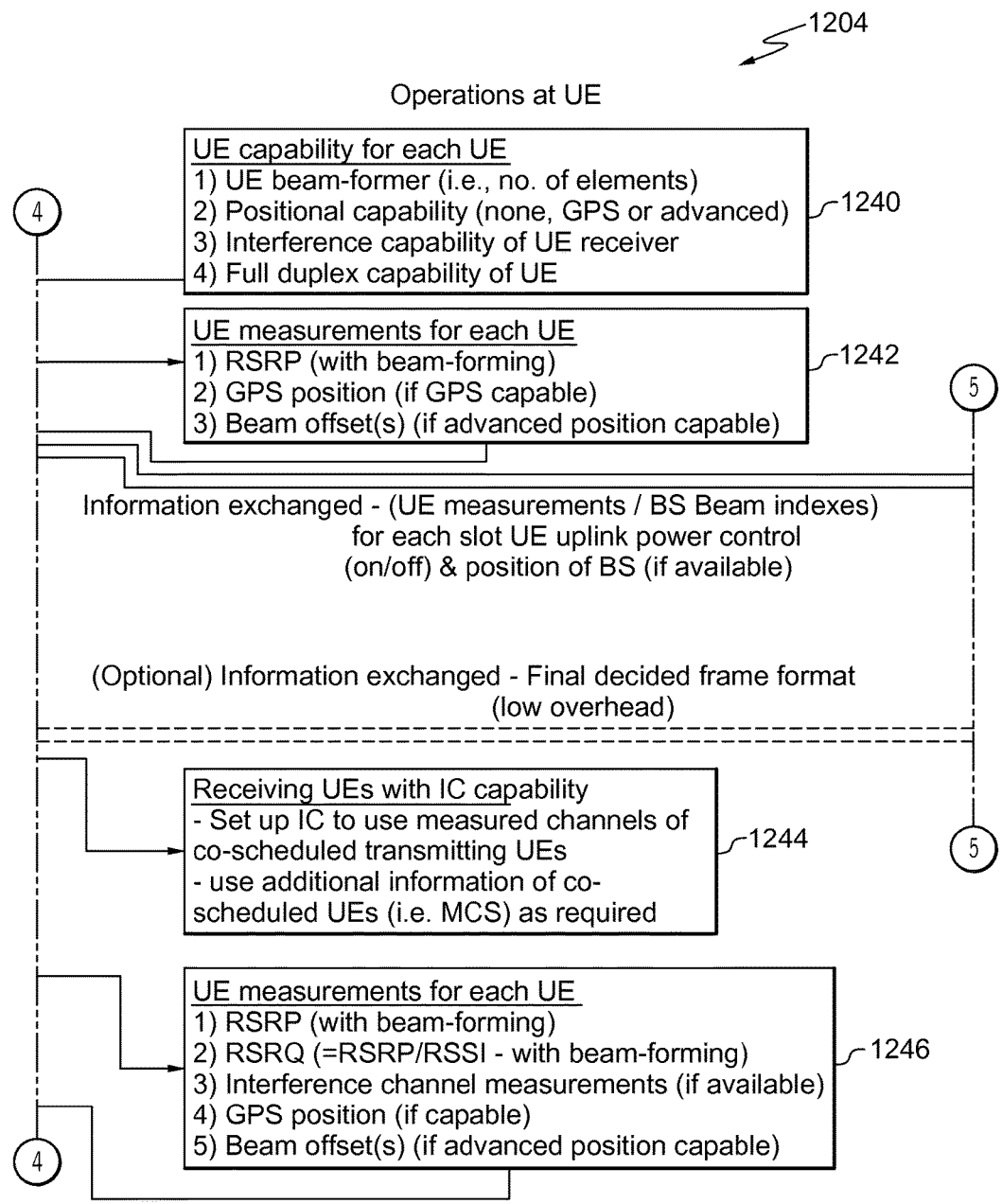
Figure 14C:
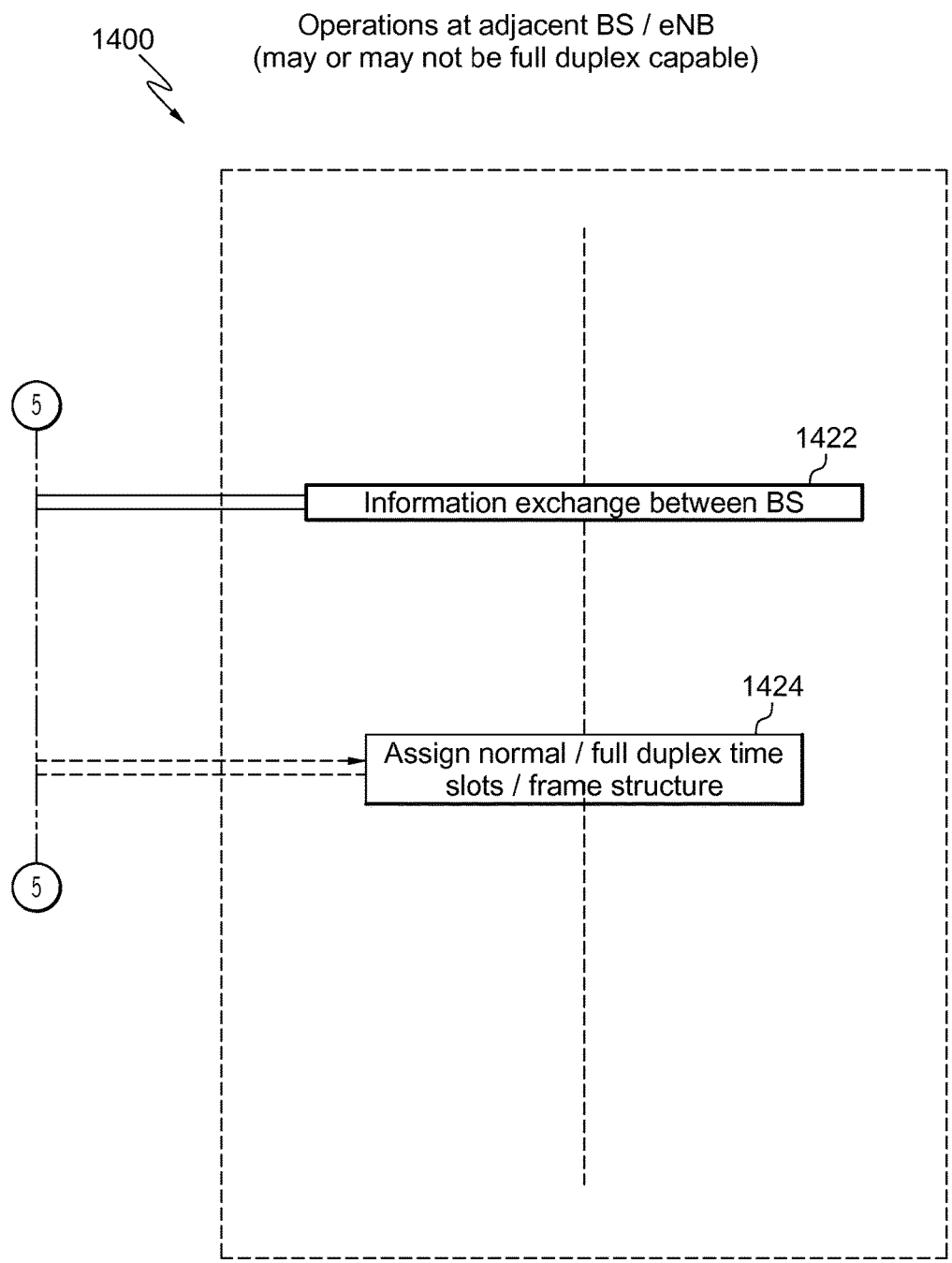

FIGS. 14A-14C are a flowchart illustrating another method for scheduling of user for full duplex operation in a wireless network, in accordance with various embodiments. This method provides scheduling of UEs for full duplex communications on a less frequent than a frame-by-frame basis when the UEs are on the edge of a cell's coverage area or a sector's coverage area.

If a low latency high bandwidth connection (i.e. using the mmWave band) is not available for base station-to-base station communication, as used in the embodiment of FIGS. 13A-13C, the latency and capacity of a conventional X2 backhaul link (i.e., LTE) may not be able to support the communications of the embodiment of FIGS. 13A-13C. Thus, the embodiment illustrated in FIGS. 14A-14C provides the base station exchange information (e.g., base station position, uplink power control indication, beam allocation per slot (or per sub-frame) for normal (no duplex) frames, UE measurements per slot (or per sub-frame) for normal frames, chosen frame format) on a less frequent basis than per frame. Each base station may initially schedule UEs to avoid interference in the neighboring cell and update interference estimates in the serving cell based on the UEs' interference reports.

The embodiment of FIGS. 14A-14C is substantially similar to the embodiment disclosed in FIGS. 12A-12B and discussed previously. Only those blocks 1402, 1422, 1424 that are different are discussed. The other blocks of FIGS. 14A-14C are assumed to have substantially the same function as previously discussed.

At block 1402, after the serving base station has requested the UE to perform measurements with a normal, non-full duplex transmission (see block 1216), information is exchanged between base stations 1203, 1400. The exchanged information may include UE channel measurements and/or base station beam indexes for each time period, UE uplink power control status (i.e., on/off), and/or position of the transmitting base station if it is available. In response to the information from the serving base station 1203, the neighboring base station 400 transmits substantially similar information back in block 1422.

In an optional step, block 1220 may exchange frame format information with the neighboring base station 1400. For example, blocks 1220, 1424 may exchange on a frame by frame basis the base station beam allocation per slot (or per sub-frame) for full duplex frames and/or UE measurements per slot (or per sub-frame) for full duplex frames as well as other frame format information.

Figure 15:
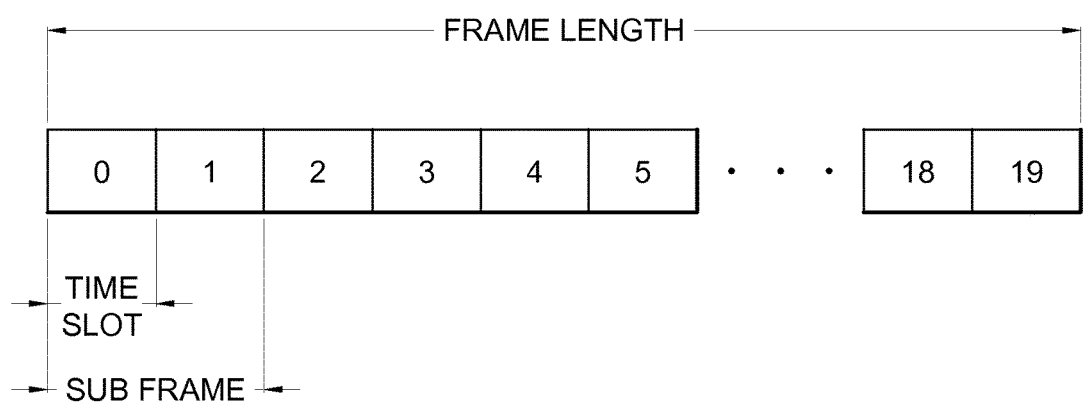
FIG. 15 is a block diagram illustrating an example of a frame structure, in accordance with various embodiments.

FIG. 15 is a block diagram illustrating an example of a frame structure, in accordance with various embodiments. The illustrated frame structure is for purposes of illustration only. The present disclosure is not limited to any one frame structure. In one embodiment, the frame structure is a 3GPP LTE defined frame as used in a frequency division duplex embodiment.

For example, the frame length may include twenty individual time slots 0-19. A sub-frame may be defined as two time slots and is the usual scheduling block for LTE-A. The frame length may be 10 milliseconds long consisting of 10 sub-frames (or 20 slots).

Figure 16:
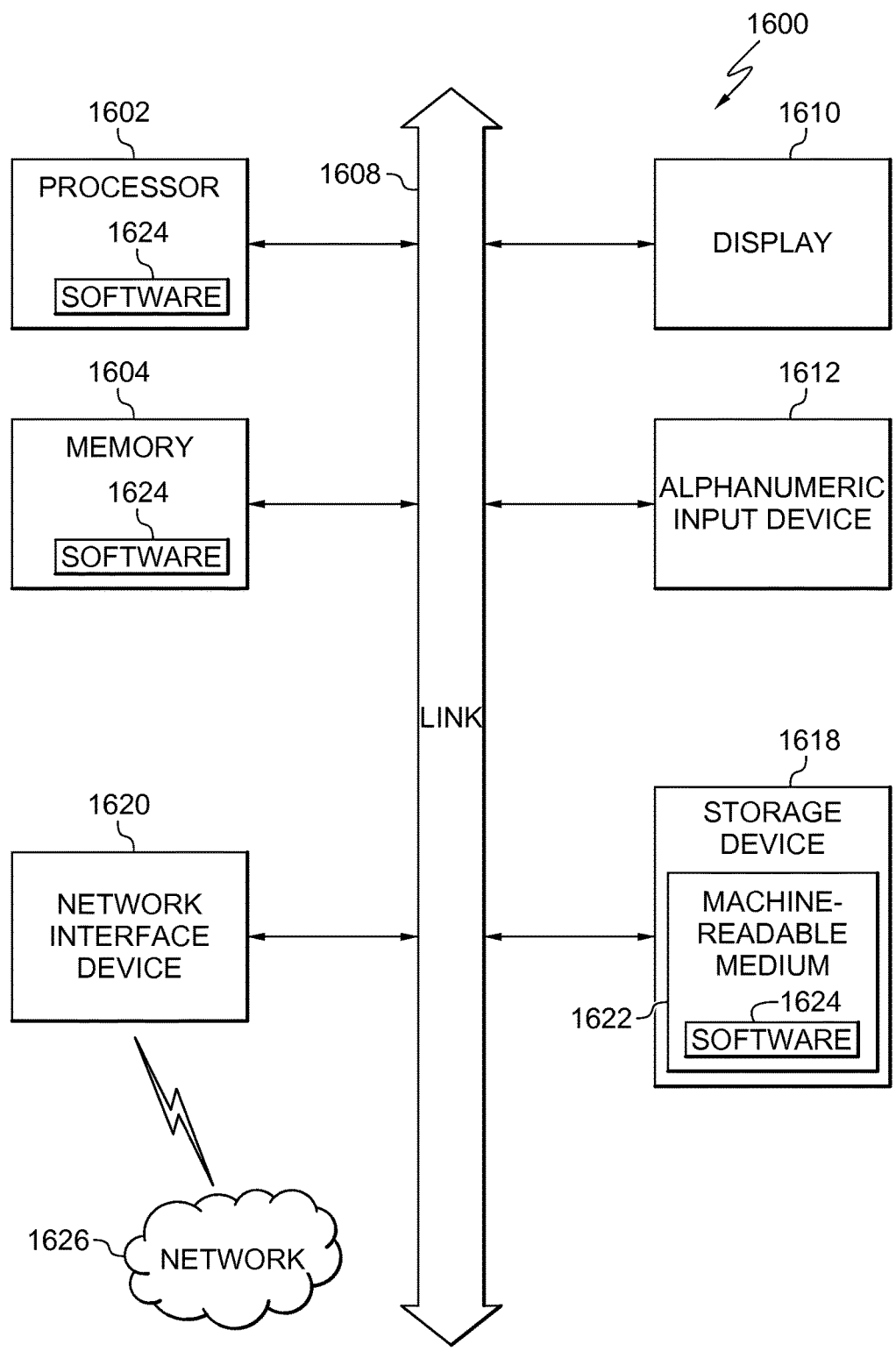
FIG. 16 is a block diagram illustrating a communication apparatus, in accordance with various embodiments.

FIG. 16 is a block diagram illustrating a communication apparatus, in accordance with various embodiments. The communication apparatus 1600 may be in the example form of a UE, a cellular base station (e.g., eNodeB, eNB), an access point (AP), or some other wireless station. For example, the communication apparatus 1600 may be a computer, a personal computer (PC), a tablet PC, a hybrid tablet, a personal digital assistant (PDA), or part of any device configured to execute instructions (sequential or otherwise) that specify actions to be taken by the communication apparatus 1600.

The term "processor-based system" shall be taken to include any set of one or more communication apparatuses that are controlled by or operated by processing circuitry (e.g., a controller) to individually or jointly execute instructions to perform any one or more of the methodologies discussed herein. A set or sequence of instructions may be executed to cause the communication apparatus to perform any one of the methodologies discussed herein, according to an example embodiment.

The communication apparatus 1600 may include at least one controller 1602 (e.g., a central processing unit (CPU), a graphics processing unit (GPU) or both, processor cores, compute nodes, etc.), and memory 1604 that communicate with each other via a link 1608 (e.g., bus). If the communication apparatus 1600 is a UE, it may further include a display device 1610 (e.g., video, LED, LCD) and an alphanumeric input device 1612 (e.g., a keypad, keyboard). In one embodiment, the display device 1610 and the input device 1612 may be incorporated in one unit as a touch screen display.

The communication apparatus 1600 may additionally include a mass storage device 1616 (e.g., a drive unit, hard disk drive, solid state drive, optical drive) and a network interface device 1620. The network interface device 1620 may include one or more radios (e.g., transmitters and receivers (transceivers)) coupled to a plurality of antenna elements in order to communicate over a wireless network channel 1626, as illustrated in FIG. 1. The one or more radios may be configured to operate using one or more communication techniques including the method for interference cancellation of multi-user, full duplex in band communications disclosed herein. The network interface device 1620 may also include a wired network interface (e.g., X2 backhaul link).

The storage device 1616 includes a computer-readable medium 1622 on which is stored one or more sets of data structures and instructions 1624 (e.g., software) embodying or utilized by any one or more of the methodologies or functions described herein. The instructions 1624 may also reside, completely or at least partially, within the memory 1604 and/or within the controller 1602 during execution thereof by the communication apparatus 1600.

While the computer-readable medium 1622 is illustrated in an example embodiment to be a single medium, the term "computer-readable medium" may include a single medium or multiple media (e.g., a centralized or distributed database, and/or associated caches and servers) that store the one or more instructions 1624.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, a system may include one or more processors and may be configured with instructions stored on a computer-readable storage device.

The Abstract is provided with the understanding that it will not be used to limit or interpret the scope or meaning of the claims. The following claims are hereby incorporated into the detailed description, with each claim standing on its own as a separate embodiment.

What is claimed is:
1. A method comprising:
determining one or more angular differences between allocated base station beams for a plurality of communication devices that comprises a first communication device receiving from a base station and a second communication device transmitting to the base station;
receiving first antenna array information from the first communication device, the first antenna array information indicating a first back to front rejection ratio of a first antenna array of the first communication device;
receiving second antenna array information from the second communication device, the second antenna array information indicating a second back to front rejection ratio of a second antenna array of the second communication device; and
scheduling, based on the determined angular differences, a reference signal received power of the first and second communication devices, the first back to front rejection ratio, and the second back to front rejection ratio, the first communication device together with at least the second communication device for full duplex time periods over a communication channel with the base station.

2. The method of claim 1, wherein the scheduling of the first communication device together with at least the second communication device for the full duplex time periods over the communication channel with the base station is further based on base station channel measurements.

3. The method of claim 1, further comprising:
receiving from the first a first communication device beam offset.

4. The method of claim 3, further comprising:
determining, by the base station, reference signal received power for each transmitting communication device served by the base station, a communication device uplink power control indication, or a relative position of the first communication device relative to the base station.

5. The method of claim 1, wherein the scheduling is further based on a beamforming capability of the communication devices or position capabilities of the communication devices.

6. The method of claim 1, wherein the scheduling of the first communication device together with at least the second communication device for the full duplex time periods over the communication channel with the base station comprises:
receiving, from the first communication device, communication device measured channel conditions during a non-full duplex transmission time period;
constructing a list of served communication devices for a full duplex time period;
assigning normal and full duplex time periods in a frame structure; and
providing communication devices served in a downlink, having interference cancellation capabilities, with parameters of a demodulation reference signal or modulation and coding scheme levels assigned to co-scheduled uplink communication devices.

7. The method of claim 6, further comprising updating the scheduling of the first communication device together with at least the second communication device for the full duplex time periods by:
requesting communication device channel measurements from the full duplex time periods;
assigning a different base station beam to the first communication device based on a reference signal received power measurement received from the first communication device; and
updating the list of served communication devices for full duplex operation based either on the communication device measured channel conditions received from the first communication device or on interference measurements from the first communication device.

8. The method of claim 7, further comprising removing the first communication device from the list of served communication devices for the full duplex time period if the first communication device has moved out of a coverage area of the base station.

9. The method of claim 1, further comprising exchanging base station information between the base station and an adjacent base station wherein the base station information comprises base station beam directions for each non-full duplex time period and communication device uplink power control status.

10. The method of claim 9, further comprising exchanging base station beam allocation for full duplex time periods or communication device measurements for full duplex time periods between the base station and the adjacent base station.

11. The method of claim 9, further comprising updating the scheduling of the first communication device together with at least the second communication device for the full duplex time periods based on the base station information from the adjacent base station.

12. The method of claim 11, wherein the base station information from the adjacent base station comprises adjacent base station served communication device measured channel conditions, adjacent base station served communication device capabilities, and adjacent base station beam indices for each time period, time slot or sub-frame.

13. A base station comprising:
a memory that stores instructions; and
processing circuitry that is coupled to the memory and is configured by the instructions to:
determine one or more angular differences between allocated base station beams for a plurality of communication devices that comprises a first communication device receiving from the base station and a second communication device transmitting to the base station;
receive first antenna array information from the first communication device, the first antenna array information indicating a first back to front rejection ratio of a first antenna array of the first communication device;
receive second antenna array information from the second communication device, the second antenna array information indicating a second back to front rejection ratio of a second antenna array of the second communication device; and
schedule, based on the determined angular differences, a reference signal received power of the first and second communication devices, the first back to front rejection ratio, and the second back to front rejection ratio, the first communication device together with at least the second communication device for full duplex time periods of a communication channel.

14. The base station of claim 13, wherein the processing circuitry is further configured by the instructions to control exchange of received communication device measured channel conditions and base station beam assignments with an adjacent base station on a frame-by-frame basis.

15. The base station of claim 14, wherein the processing circuitry is further configured by the instructions to:
receive, from the first communication device, a first communication device beam offset.

16. The base station of claim 13, wherein the processing circuitry is further configured by the instructions to schedule the first communication device for full duplex time periods of the communication channel based on base station channel measurements.

17. The base station of claim 13, wherein the processing circuitry is further configured by the instructions to avoid uplink/downlink co-scheduling of communication devices having beamforming capability, for full duplex time periods, when the communication devices are served by diagonally opposite beams at the base station unless:
the first communication device does not have uplink power control applied and a sum of a reference signal received power (RSRP) for the first communication device, measured at the base station, and an RSRP for the second communication device, measured at the second communication device, is less than a first predetermined threshold that has been determined to result in reliable full-duplex communication; or the communication devices have uplink power control applied and the RSRP for the second communication device is less than a second predetermined threshold that has been determined to result in reliable full-duplex communication.

18. The base station of claim 13, wherein:
the received first antenna array information further indicates a first number of antenna elements of the first communication device;
the received second antenna array information further indicates a second number of antenna elements of the second communication device; and
the scheduling is further based on a reference signal received power of the first and second communication devices, the first number of antenna elements, and the second number of antenna elements.

19. The base station of claim 13, wherein the processing circuitry is further configured by the instructions to determine an estimated distance between the communication devices based on a reference signal received power (RSRP) of the first communication device and an RSRP of the second communication device.

20. The base station of claim 13, wherein the processing circuitry is further configured by the instructions to avoid co-scheduling for full duplex time periods, the first communication device (UE1) and the second communication device (UE2), that are determined to be served by diagonally opposite base station beams, wherein determining that the UE1 and the UE2 are served by diagonally opposite base station beams is based on position information of the communication devices and the base station (BS) with respect to a known reference point.

21. A non-transitory computer-readable storage medium that stores instructions for scheduling full duplex time periods, that when executed by processing circuitry of a base station, cause the processing circuitry to perform steps of:
determining one or more angular differences between allocated base station beams for a plurality of communication devices that comprises a first communication device receiving from the base station and a second communication device transmitting to the base station;
receiving first antenna array information from the first communication device, the first antenna array information indicating a first back to front rejection ratio of a first antenna array of the first communication device;
receiving second antenna array information from the second communication device, the second antenna array information indicating a second back to front rejection ratio of a second antenna array of the second communication device; and
scheduling, based on the determined angular differences, a reference signal received power of the first and second communication devices, the first back to front rejection ratio, and the second back to front rejection ratio, the first communication device together with at least the second communication device for full duplex time slots of a communication channel with the base station.

22. The non-transitory computer-readable storage medium of claim 21, wherein the processing circuitry further performs the step of receiving communication device capabilities comprising positional capability of the communication devices, interference cancellation capability of the communication devices, or full duplex capability of the communication devices.

23. The non-transitory computer-readable storage medium of claim 22, wherein the processing circuitry further performs the step of receiving communication device capabilities comprising advanced positional capability including at least one of gyroscope, accelerometer, or compass sensors.

24. The non-transitory computer-readable storage medium of claim 21, wherein the processing circuitry further performs the step of receiving communication device measured channel conditions including reference signal received power and at least one of communication device position or communication device beam offset.

25. The method of claim 1, wherein the scheduling is further based on received communication device measured channel conditions.

26. The method of claim 1, wherein the scheduling is further based on received communication device positional information.

27. The base station of claim 13, wherein the scheduling is further based on received communication device measured channel interference.

28. The base station of claim 13, wherein the scheduling is further based on received communication device measured channel conditions.

29. The base station of claim 13, wherein the scheduling is further based on received communication device positional information updates.

30. The non-transitory computer-readable storage medium of claim 21, wherein the scheduling is further based on received communication device measured channel conditions.

31. The non-transitory computer-readable storage medium of claim 21, wherein the scheduling is further based on received communication device positional information.

* * * * *